US010682597B2

(12) United States Patent
Krull et al.

(10) Patent No.: US 10,682,597 B2
(45) Date of Patent: Jun. 16, 2020

(54) FILTER SYSTEM

(71) Applicants: Timothy L. Krull, Kearney, NE (US); Trenton Yendra, Gibbon, NE (US); Jeffrey E. D. Rogers, Kearney, NE (US); Jason LaMarr Tate, Thompsons Station, TN (US); Brian T. Ehrenberg, Kansas City, MO (US); Michael J. Von Seggern, Kearney, NE (US)

(72) Inventors: Timothy L. Krull, Kearney, NE (US); Trenton Yendra, Gibbon, NE (US); Jeffrey E. D. Rogers, Kearney, NE (US); Jason LaMarr Tate, Thompsons Station, TN (US); Brian T. Ehrenberg, Kansas City, MO (US); Michael J. Von Seggern, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 134 days.

(21) Appl. No.: 15/483,815

(22) Filed: Apr. 10, 2017

(65) Prior Publication Data

US 2017/0296949 A1    Oct. 19, 2017

Related U.S. Application Data

(60) Provisional application No. 62/422,242, filed on Nov. 15, 2016, provisional application No. 62/328,462, (Continued)

(51) Int. Cl.
*B01D 46/00* (2006.01)
*B01D 35/30* (2006.01)
(Continued)

(52) U.S. Cl.
CPC ........... *B01D 35/30* (2013.01); *B01D 21/265* (2013.01); *B01D 29/56* (2013.01); *B01D 45/16* (2013.01);
(Continued)

(58) Field of Classification Search
CPC ...... B01D 35/30–35/34; B01D 46/0005–0009; B01D 46/0023;
(Continued)

(56) References Cited

U.S. PATENT DOCUMENTS 1,700,126 A    1/1929 Godloe
1,943,080 A    1/1934 Langston
(Continued)

FOREIGN PATENT DOCUMENTS

DE    29 47 080 A1    5/1981
EP    0 630 672 A1    12/1994
(Continued)

*Primary Examiner* — T. Bennett McKenzie
(74) *Attorney, Agent, or Firm* — Reinhart Boerner Van Deuren P.C.

(57) ABSTRACT

A filter system and filters and housing components for use in the filter system are provided. The filter system includes at least one filter received within a housing having a cover and a housing body. The filter includes at least one latch tab engaged by the cover to secure the cover. First and second seals seal the system. The latch tab extends axially beyond a catch of the housing body. A filter system is also provided that includes a pre-cleaner through which fluid moves in a first direction different than a second direction as the fluid flows through the filters thereof. Methods of servicing the filter system are also provided.

13 Claims, 37 Drawing Sheets

Related U.S. Application Data filed on Apr. 27, 2016, provisional application No. 62/322,617, filed on Apr. 14, 2016.

(51) Int. Cl.
  *B01D 50/00* (2006.01)
  *B01D 21/26* (2006.01)
  *B01D 29/56* (2006.01)
  *B01D 45/16* (2006.01)

(52) U.S. Cl.
  CPC ..... *B01D 46/0005* (2013.01); *B01D 46/0023* (2013.01); *B01D 50/002* (2013.01); *B01D 2201/0415* (2013.01); *B01D 2201/305* (2013.01); *B01D 2265/028* (2013.01); *B01D 2267/60* (2013.01); *B01D 2271/022* (2013.01)

(58) Field of Classification Search
  CPC ...... B01D 2201/305; B01D 2201/0415; B01D 2201/0423; B01D 21/265; B01D 29/56; B01D 45/16; B01D 50/002; B01D 2265/028; B01D 2267/60; B01D 2271/022; B01D 46/00; B01D 46/16
  USPC .................................................. 55/490–519
  See application file for complete search history.

(56) References Cited

U.S. PATENT DOCUMENTS

| | | |
|---|---|---|
| 1,947,066 A | 2/1934 | Sieg |
| 1,954,881 A | 4/1934 | List |
| 2,690,802 A | 10/1954 | Russell |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,635,001 A | 1/1972 | Komroff et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,373,635 A | 2/1983 | Mules |
| 4,486,201 A | 12/1984 | Noguchi |
| 4,498,989 A | 2/1985 | Miyakawa et al. |
| 4,579,698 A | 4/1986 | Meyering et al. |
| 4,589,983 A | 5/1986 | Wydevan |
| 4,710,297 A | 12/1987 | Suzuki et al. |
| 4,720,292 A | 1/1988 | Engel et al. |
| 4,747,944 A | 5/1988 | George |
| H556 H | 12/1988 | Tarko |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,167,683 A | 12/1992 | Behrendt et al. |
| 5,182,015 A | 1/1993 | Lee |
| 5,186,829 A | 2/1993 | Janik |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,342,511 A | 8/1994 | Brown et al. |
| 5,346,675 A | 9/1994 | Usui et al. |
| 5,374,006 A | 12/1994 | Mheidle |
| 5,389,175 A | 2/1995 | Wenz |
| 5,415,677 A | 5/1995 | Ager et al. |
| 5,435,870 A | 7/1995 | Takagaki et al. |
| 5,449,086 A | 9/1995 | Harris |
| 5,472,379 A | 12/1995 | Andress et al. |
| 5,474,337 A | 12/1995 | Nepsund et al. |
| 5,484,466 A | 1/1996 | Brown et al. |
| 5,487,767 A | 1/1996 | Brown |
| 5,490,930 A | 2/1996 | Krull |
| 5,588,945 A | 2/1996 | Lauderbaugh |
| 5,513,717 A | 5/1996 | Louis et al. |
| 5,525,226 A | 6/1996 | Brown et al. |
| 5,543,007 A | 8/1996 | Takagaki et al. |
| 5,605,554 A | 2/1997 | Kennedy |
| 5,609,711 A | 3/1997 | Miller |
| 5,669,949 A | 9/1997 | Dudrey et al. |
| 5,676,273 A | 10/1997 | Jonkers et al. |
| 5,685,985 A | 11/1997 | Brown et al. |
| 5,720,790 A | 2/1998 | Kometani et al. |
| 5,755,843 A | 5/1998 | Sundquist |
| 5,772,883 A | 6/1998 | Rothman et al. |
| D396,098 S | 7/1998 | Gillingham et al. |
| 5,792,242 A | 8/1998 | Haskett |
| 5,792,247 A | 8/1998 | Gillingham et al. |
| 5,795,361 A | 8/1998 | Lanier, Jr. et al. |
| 5,820,646 A | 10/1998 | Gillingham et al. |
| 5,895,574 A | 4/1999 | Friedmann et al. |
| 5,897,676 A | 4/1999 | Engel et al. |
| 5,902,364 A | 5/1999 | Tokar et al. |
| 5,906,740 A | 5/1999 | Brown et al. |
| 5,938,804 A | 8/1999 | Engel et al. |
| 6,004,366 A | 12/1999 | Engel et al. |
| 6,022,305 A | 2/2000 | Choi et al. |
| 6,024,229 A | 2/2000 | Ayers |
| 6,048,386 A | 4/2000 | Gillingham et al. |
| 6,099,606 A | 8/2000 | Miller et al. |
| 6,126,833 A | 10/2000 | Stobbe et al. |
| 6,146,527 A | 11/2000 | Oelschlaegel |
| 6,179,890 B1 | 1/2001 | Ramos et al. |
| D437,402 S | 2/2001 | Gieseke et al. |
| 6,187,188 B1 | 2/2001 | Janik et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| 6,258,145 B1 | 7/2001 | Engel et al. |
| 6,261,334 B1 | 7/2001 | Morgan et al. |
| 6,290,635 B1 | 9/2001 | Demmel et al. |
| D450,827 S | 11/2001 | Gieseke et al. |
| D450,828 S | 11/2001 | Tokar |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| 6,405,875 B1 | 6/2002 | Cutler |
| D460,169 S | 7/2002 | Anderson et al. |
| D461,003 S | 7/2002 | Gieseke et al. |
| 6,413,289 B2 | 7/2002 | Engel et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,521,009 B2 | 2/2003 | Engel et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,780,217 B1 | 8/2004 | Palmer |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| 6,887,343 B2 | 5/2005 | Schukar et al. |

(56) References Cited

U.S. PATENT DOCUMENTS

| | | | |
|---|---|---|---|
| 6,893,561 B2 | 5/2005 | Janiek | |
| D506,539 S | 6/2005 | Bishop et al. | |
| 6,946,012 B1 | 9/2005 | Miller et al. | |
| 6,955,701 B2 | 10/2005 | Schrage | |
| 6,959,819 B2 | 11/2005 | Moscaritolo et al. | |
| 6,960,245 B2 | 11/2005 | Tokar et al. | |
| 6,966,940 B2 | 11/2005 | Krisko et al. | |
| 6,974,490 B2 | 12/2005 | Gillingham et al. | |
| 6,994,744 B2 | 2/2006 | Tokar et al. | |
| 6,997,968 B2 | 2/2006 | Xu et al. | |
| 7,001,450 B2 | 2/2006 | Gieseke et al. | |
| 7,008,465 B2 | 3/2006 | Graham et al. | |
| 7,008,467 B2 | 3/2006 | Krisko et al. | |
| 7,059,481 B2 | 6/2006 | Kochert et al. | |
| 7,090,712 B2 | 8/2006 | Gillingham et al. | |
| 7,150,903 B2 | 12/2006 | Frey | |
| 7,168,573 B2 | 1/2007 | Brown et al. | |
| 7,179,317 B2 | 2/2007 | Chung et al. | |
| 7,211,124 B2 | 5/2007 | Gieseke et al. | |
| 7,252,704 B2 | 8/2007 | Tokar et al. | |
| 7,255,300 B2 | 8/2007 | Johnston | |
| 7,270,692 B2 | 9/2007 | Gillingham et al. | |
| 7,282,075 B2 | 10/2007 | Sporre et al. | |
| 7,300,486 B1 | 11/2007 | Kirsch | |
| 7,303,604 B2 | 12/2007 | Gieseke et al. | |
| 7,316,723 B2 | 1/2008 | Chung et al. | |
| 7,318,851 B2 | 1/2008 | Brown et al. | |
| 7,318,852 B2 | 1/2008 | Chung et al. | |
| 7,323,029 B2 | 1/2008 | Engelland et al. | |
| 7,329,326 B2 | 2/2008 | Wagner et al. | |
| 7,338,544 B2 | 3/2008 | Sporre et al. | |
| 7,341,613 B2 | 3/2008 | Kirsch | |
| 7,351,270 B2 | 4/2008 | Engelland et al. | |
| 7,393,375 B2 | 7/2008 | Xu et al. | |
| 7,396,375 B2 | 7/2008 | Nepsund et al. | |
| 7,396,376 B2 | 7/2008 | Schrage et al. | |
| 7,425,227 B1 | 9/2008 | Hutchinson et al. | |
| 7,455,707 B2 | 11/2008 | Engel et al. | |
| 7,625,418 B1 | 12/2009 | Choi | |
| 7,674,308 B2 | 3/2010 | Krisko et al. | |
| 7,695,539 B2 | 4/2010 | Waibel | |
| 7,753,982 B2 | 7/2010 | Merritt | |
| 7,931,725 B2 | 4/2011 | Wydeven et al. | |
| 8,277,531 B2 | 10/2012 | Brown et al. | |
| 8,277,532 B2 * | 10/2012 | Reichter | B01D 46/526 55/502 |
| 8,292,983 B2 | 10/2012 | Reichter et al. | |
| 8,361,181 B2 | 1/2013 | Osendorf et al. | |
| 8,592,703 B2 | 11/2013 | Johnson et al. | |
| 8,673,043 B2 | 3/2014 | Merritt | |
| 8,685,301 B2 | 4/2014 | Swanson et al. | |
| 8,709,119 B2 | 4/2014 | Reichter et al. | |
| 8,945,268 B2 | 2/2015 | Nelson et al. | |
| 9,089,804 B2 | 7/2015 | Campbell et al. | |
| 2002/0100262 A1 | 8/2002 | Gieseke et al. | |
| 2002/0184864 A1 | 12/2002 | Bishop et al. | |
| 2002/0185007 A1 | 12/2002 | Xu et al. | |
| 2002/0185008 A1 | 12/2002 | Anderson et al. | |
| 2003/0089654 A1 | 5/2003 | Jainek | |
| 2003/0121845 A1 | 7/2003 | Wagner et al. | |
| 2003/0146149 A1 | 8/2003 | Binder et al. | |
| 2003/0182909 A1 | 10/2003 | Gieseke et al. | |
| 2003/0192822 A1 * | 10/2003 | Cherry, Sr. | B01D 46/10 210/435 |
| 2003/0217534 A1 | 11/2003 | Krisko et al. | |
| 2003/0226800 A1 | 12/2003 | Brown et al. | |
| 2004/0071940 A1 | 4/2004 | Frey | |
| 2004/0118771 A1 | 6/2004 | Schukar et al. | |
| 2004/0194441 A1 | 10/2004 | Kirsch | |
| 2004/0221555 A1 | 11/2004 | Engelland et al. | |
| 2005/0029184 A1 | 2/2005 | Desmarais | |
| 2005/0081497 A1 | 4/2005 | Connor et al. | |
| 2005/0166561 A1 | 8/2005 | Schrage et al. | |
| 2005/0229561 A1 | 10/2005 | Nepsund et al. | |
| 2005/0252182 A1 | 11/2005 | Golden et al. | |
| 2005/0284116 A1 | 12/2005 | Duffy | |
| 2006/0002857 A1 | 1/2006 | Frangioni | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2006/0101795 A1 | 5/2006 | Krisko et al. | |
| 2006/0137316 A1 | 6/2006 | Krull et al. | |
| 2006/0151655 A1 | 7/2006 | Johnston | |
| 2006/0163150 A1 | 7/2006 | Golden et al. | |
| 2007/0039296 A1 | 2/2007 | Schrage et al. | |
| 2007/0175194 A1 | 8/2007 | Nepsund et al. | |
| 2007/0186528 A1 | 8/2007 | Wydeven et al. | |
| 2007/0193236 A1 | 8/2007 | Merritt | |
| 2007/0199285 A1 | 8/2007 | Gieseke et al. | |
| 2007/0234903 A1 | 10/2007 | Xu et al. | |
| 2007/0261374 A1 | 11/2007 | Nelson et al. | |
| 2007/0289265 A1 | 12/2007 | Coulonvaux et al. | |
| 2008/0010959 A1 | 1/2008 | Gillingham et al. | |
| 2008/0016832 A1 | 1/2008 | Krisko et al. | |
| 2008/0022641 A1 | 1/2008 | Engelland et al. | |
| 2008/0060329 A1 | 3/2008 | Brown et al. | |
| 2008/0066434 A1 | 3/2008 | Kuempel et al. | |
| 2008/0086990 A1 | 4/2008 | Kuempel et al. | |
| 2008/0110142 A1 | 5/2008 | Nelson et al. | |
| 2008/0110822 A1 | 5/2008 | Chung et al. | |
| 2008/0115470 A1 | 5/2008 | Kuempel et al. | |
| 2008/0115758 A1 | 5/2008 | Engelland et al. | |
| 2008/0135471 A1 | 6/2008 | Merritt et al. | |
| 2008/0209874 A1 | 9/2008 | Gieseke et al. | |
| 2008/0216654 A1 | 9/2008 | Wagner et al. | |
| 2008/0250763 A1 | 10/2008 | Widerski et al. | |
| 2008/0250766 A1 | 10/2008 | Schrage et al. | |
| 2008/0264020 A1 | 10/2008 | Schrage et al. | |
| 2009/0114590 A1 | 5/2009 | Merritt et al. | |
| 2009/0211450 A1 | 8/2009 | Mosset et al. | |
| 2009/0241494 A1 | 10/2009 | Schrage et al. | |
| 2009/0255227 A1 | 10/2009 | Schrage et al. | |
| 2009/0266041 A1 | 10/2009 | Schrage et al. | |
| 2009/0301045 A1 | 12/2009 | Nelson et al. | |
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0011725 A1 | 1/2010 | Babb | |
| 2010/0044297 A1 | 2/2010 | Krogue et al. | |
| 2010/0115897 A1 | 5/2010 | Krisko et al. | |
| 2010/0162673 A1 | 7/2010 | Grosche et al. | |
| 2010/0242425 A1 | 9/2010 | Swanson et al. | |
| 2011/0126713 A1 | 6/2011 | Legare et al. | |
| 2011/0186504 A1 | 8/2011 | Rocklitz | |
| 2011/0197556 A1 | 8/2011 | Brown et al. | |
| 2013/0000267 A1 * | 1/2013 | Merritt | B01D 46/527 55/490 |
| 2014/0137524 A1 | 5/2014 | Jarrier | |
| 2014/0223872 A1 | 8/2014 | Bao et al. | |
| 2014/0325945 A1 | 11/2014 | Coulonvaux et al. | |
| 2014/0360144 A1 | 12/2014 | Coulonvaux et al. | |
| 2015/0068174 A1 | 3/2015 | Kirsko et al. | |

FOREIGN PATENT DOCUMENTS

| | | |
|---|---|---|
| GB | 1 579 883 | 11/1980 |
| GB | 2 103 106 A | 2/1983 |
| JP | S60-112320 | 7/1985 |
| JP | S60-124622 | 8/1985 |
| JP | 63-122617 | 6/1988 |
| WO | WO 91/19898 A1 | 12/1991 |
| WO | WO 97/40918 A1 | 11/1997 |
| WO | WO 03/047722 A2 | 6/2003 |
| WO | WO 03/084641 A2 | 10/2003 |
| WO | WO 2005/058461 A1 | 6/2005 |
| WO | WO 2005/077487 A1 | 8/2005 |
| WO | WO 2005/082484 A1 | 9/2005 |
| WO | WO 2005/094655 A2 | 10/2005 |
| WO | WO 2006/014941 A2 | 2/2006 |
| WO | WO 2006/017790 A1 | 2/2006 |
| WO | WO 2006/076456 A1 | 7/2006 |

(56) References Cited

FOREIGN PATENT DOCUMENTS

| | | |
|---|---|---|
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/087233 A3 | 8/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |
| WO | WO 2010/017407 A1 | 2/2010 |
| WO | WO 2013/017921 | 2/2013 |
| WO | WO 2015/039993 | 3/2015 |
| WO | WO 2015/153363 | 10/2015 |
| WO | WO 2017/031168 A | 2/2017 |

* cited by examiner

FILTER SYSTEM

CROSS-REFERENCE TO RELATED PATENT APPLICATIONS

This patent application claims the benefit of U.S. Provisional Patent Application No. 62/322,617, filed Apr. 14, 2016, U.S. Provisional Patent Application No. 62/328,462, filed Apr. 27, 2016, and U.S. Provisional Patent Application No. 62/422,242, filed Nov. 15, 2016, the entire teachings and disclosure of which are incorporated herein by reference thereto.

FIELD OF THE INVENTION

This invention generally relates to filter systems, filter cartridges for filter systems and filter housings of filter systems for carrying filter cartridges.

BACKGROUND OF THE INVENTION

Filter systems for filter fluids are used to remove impurities from the fluids such as gasses (e.g. air) and liquids. The filter system may include a filter housing that can replaceably receive one or more filters (often referred to as filter cartridges or filter elements). The filter housing (also referred to herein simply as a housing) may have a housing body and a cover that defines a central cavity in which the one or more filters is received. The one or more filters will have a filter media through which the fluid flows to remove the impurities.

The filter system is configured such that the one or more filters are positioned and received within the filter housing such that fluid is prevented from bypassing the filter media. Issues can arise as it relates to preventing fluid bypass, securing the various components together and in appropriate relationship, prevention of the use of improper filter elements that are not properly sized or do not meet capacity and efficiency requirements from being used, etc.

The filters are typically removable from the housing such that the filters can be replaced at predetermined maintenance intervals or when the serviceable life of the filters otherwise ends due to the amount of impurities that have accumulated within the filters.

Various aspects of the present invention are directed towards improvements in the features of filter systems including the filters, the filter housing and/or the interaction of the various components of the filter housing to provide improved operation of the system.

BRIEF SUMMARY OF THE INVENTION

In an embodiment of the invention a filter is provided. The filter includes a filter media pack, frame member, a flange portion and a tab. The filter media pack has an inlet face and an outlet face with a central axis extending transversely through the inlet and outlet faces. The frame member is attached to the filter media pack. The frame member includes a flange portion projecting radially outward. The tab projects axially from the flange portion.

In an embodiment, the tab is radially spaced outward from the casing portion such that the casing portion and the tab form a gap radially therebetween.

In an embodiment, the tab extends generally parallel to the central axis.

In an embodiment, the tab extends at no more than a 15 degree angle relative to the central axis.

In an embodiment, the tab has an axial length of at least 0.25 inches, a width of at least 0.1 inches and a thickness of 0.1 inches.

In an embodiment, the tab has a T-shaped cross-section.

In an embodiment, the tab is integrally formed with the flange portion such that removal of the filter from a filter housing takes the tab with the filter.

In an embodiment, the flange portion and tab are entirely axially offset from the filter media.

In an embodiment, the filter includes an annular seal surrounding the casing portion positioned radially between the casing portion and the tab.

In an embodiment, the filter includes a second tab projecting axially from the flange portion in the same direction as the other tab. The second tab has a radially projecting nib extending radially outward. The second tab is used to initially secure the filter to a filter housing body before a cover is attached.

In an embodiment, the flange portion includes a plurality of openings formed in an inlet side that faces away from the outlet face of the filter media pack.

In an embodiment, the casing portion includes an imperforate region axially offset from the filter media pack that defines a central cavity axially offset from the filter media pack.

In an embodiment, the depth of the central cavity parallel to the central axis is at least twice the distance between the inlet and outlet faces parallel to the central axis.

In an embodiment, a filter system includes a filter as outlined above. The system further includes a cover member, a housing and a latch. The housing has a central cavity and receives the filter. The housing includes a support flange for supporting and locating the filter within the central cavity. The latch secures the cover member to the housing body by engaging the tab. This could be used in embodiments where the tab is formed from a primary filter or a secondary filter.

In an embodiment, the housing body defines an axial catch. The tab extends past the catch when the filter is installed in the central cavity. The tab maintains the latch in axial engagement with the axial catch.

In an embodiment, a side of the support flange opposite a side that supports the filter provides the axial catch.

In an embodiment, the axial catch faces axially away from an end of the housing body that receives the filter.

In an embodiment, the axial catch is tapered toward the tab when the filter is installed. The tab prevents disengagement of the latch with the tab when the filter is installed.

In an embodiment, the support flange has a slot receiving the tab axially therethrough. The latch does not secure the cover member to the housing body without the tab installed in the slot.

In an embodiment, when the secondary filter is installed in the central cavity of the housing body, the flange portion is positioned on a first side of the support flange and a distal end of the tab is located on and extends beyond a second side of the support flange. The second side is axially opposite the first side. The latch engages the tab on the second side of the support flange.

In an embodiment, a radially inner side of the tab and a radially outer surface of the housing body form a relief radially therebetween in which a portion of the latch is received when the latch is in a secured state.

In an embodiment, the housing body includes a tapered region adjacent the slot that prevents the latch from maintaining engagement with the housing body when the tab is not present in the slot. The tapered region is on a side of the support flange that is opposite the side adjacent the flange portion of the filter.

In an embodiment, the frame member of the filter includes a casing portion surrounding the filter media pack. The flange portion projects radially outward from the casing portion.

In an embodiment, the filter is a secondary filter that defines a central cavity within the casing portion. The filter system further includes a primary filter having a second filter media pack and a press flange attached to the second filter media pack. The press flange is positioned axially between the cover member and the flange portion of the other filter when the primary filter and secondary filter are installed within the housing body. In other embodiments, the additional filter could be in the form of a secondary filter rather than a primary filter.

In an embodiment, the first seal member is provided between the press flange and the flange portion. A second seal member is provided between the flange portion and the support flange.

In an embodiment, the first and second seal members are independent of one another.

In an embodiment, the press flange and second filter are seal free.

In an embodiment, the cover member presses directly on the press flange.

In an embodiment, the housing body defines at least one aperture. The cover member includes at least one cover tab extending outward therefrom. The cover tab extends into the aperture in the housing body when the latch is engaged with the tab of the filter.

In an embodiment, the latch provides an axial force securing the cover member to the housing body along a first axis and the cover tab extends into the aperture in the housing body along a second axis that is generally perpendicular to the first axis.

In a further embodiment, a filter is provided. The filter includes a filter media pack and a border frame. The filter media pack has an inlet face and an outlet face. A central axis passes transversely through the inlet face and the outlet face. The border frame has a press flange extending radially outward beyond an outer periphery of the filter media pack.

In an embodiment, the press flange is seal free.

In an embodiment, the press flange has a first face that faces axially away from the filter media. The inlet and outlet faces re axially offset from the first face.

In an embodiment, wherein the press flange extends radially outward beyond an outer periphery of the filter media pack at least 0.25 inches. The press flange has an axial thickness of at least 0.1 inches.

In an embodiment, a filter assembly is provided. The filter assembly includes a primary filter, a secondary filter, a first seal and a second seal. The primary filter includes a filter media pack and a border frame. The filter media pack has an inlet face and an outlet face. A central axis passes transversely through the inlet face and the outlet face. The border frame has a press flange extending radially outward beyond an outer periphery of the filter media pack. The press flange has opposed first and second sides. The secondary filter includes a casing defining a central cavity receiving said primary filter. A seal support flange extends radially outward from the casing and has a first side that faces the press flange and an opposite second side that faces away from the press flange. The first seal is sealingly interposed between the second side of the press flange and the first side of the seal support flange. The second seal is adjacent the second side of the seal support flange.

In an embodiment, the first and second seals are affixed to the secondary filter such that removal of the primary filter from the secondary filter leaves the first and second seals with the secondary filter.

In an embodiment, the first and second seals are separate and not attached to one another such that they are distinct gaskets.

In an embodiment, the press flange includes at least one axially extending feature and the seal support flange includes at least one slot. The axially extending feature locates in the slot when the primary filter is received in the central cavity of the secondary filter.

In an embodiment, the secondary filter includes at least one latch tab extending axially on the second side of the seal support flange and is radially offset from the casing to define a gap therebetween. The second seal is positioned within the gap radially between the latch tab and the casing.

In an embodiment, the second seal circumscribes the casing.

In an embodiment, the portion of the casing that defines the central cavity of the secondary filter is imperforate.

In an embodiment, a filter system including a filter assembly, a cover and a housing body is provided. The filter assembly includes a primary filter, a secondary filter, a first seal and a second seal. The primary filter includes a filter media pack and a border frame. The filter media pack has an inlet face and an outlet face. A central axis passes transversely through the inlet face and the outlet face. The border frame has a press flange extending radially outward beyond an outer periphery of the filter media pack. The press flange has opposed first and second sides. The secondary filter includes a casing defining a central cavity receiving said primary filter. A seal support flange extends radially outward from the casing and has a first side that faces the press flange and an opposite second side that faces away from the press flange. The first seal is sealingly interposed between the second side of the press flange and the first side of the seal support flange. The second seal is adjacent the second side of the seal support flange. The housing body defines a filter receiving chamber receiving the primary and secondary filter. The housing body includes a peripheral support flange extending radially outward from the housing body. The second seal is axially interposed between the seal support flange and the peripheral support flange to seal the secondary filter to the housing body.

In an embodiment, the cover presses axially upon the press flange to provide the force to seal the first seal to the press flange and the seal support flange and to seal the second seal to the seal support flange and the peripheral support flange.

In an embodiment, the system includes at least one latch having a latched state securing the cover to the housing body. The at least one latch provides the force to activate the first and second seals when in the latched state. The at least one latch has an unlatched state that releases the force.

In an embodiment, the force of the at least one latch in the latched state compresses the first and second seals.

In an embodiment, the compression of the first and second seals occurs until the press flange axially abuts the seal support flange and the seal support flange axially abuts the peripheral support flange.

In an embodiment, the secondary filter includes at least one latch tab that is engaged by the at least one latch to secure the latch in the latched state.

In an embodiment, the cover is in the form of a precleaner.

In an embodiment, the precleaner includes spin tubes.

In an embodiment, the first seal is compressed between 15-30% axially at 6-9 psi.

In an embodiment, the press flange includes a rectangular sealing face along an underside thereof adapted for sealing.

In an embodiment, the filter includes locating means for locating and centering the filter, said locating means provided on the press flange. The locating means includes at least one axially extending feature in spaced relation to the filter media pack and defining a gap therebetween, and a rectangular sealing face extending between the at least one axially extending feature and the filter media pack. The rectangular sealing face has a radial width of at least ¼ inch, and the press flange has a radial width of at least ½ inch. The at least one axially extending feature comprises a first feature on a first side of the press flange and a second feature on a second opposite side of the press flange, wherein third and fourth sides of said press flange are free of the axially extending feature.

In an embodiment, the border frame includes an outer flange extending at an outer rectangular periphery of the press flange outboard of the sealing face and along a second side opposite the underside. The press flange is seal free. A rectangular potting channel is along an inner periphery of the border frame, adhesive material in the potting channel securing the filter media pack to the border frame. A rectangular press surface recessed below a top of the border frame and over the rectangular sealing surface adapted to facilitate loading over the sealing surface.

In an embodiment, a filter system for housing one or more filters for filtering a fluid is provided. The filter system includes a housing body, a pre-cleaner assembly and a cover member. The housing body has an upstream end and a downstream end. A central cavity is between the upstream and downstream ends holds the one or more filters when installed. The pre-cleaner assembly is upstream of the central cavity of the housing body. The cover member removably attaches to the housing body and pre-cleaner assembly when the one or more filters are located within the central cavity. The cover member is downstream from the pre-cleaner assembly and upstream of the housing body.

In an embodiment, the housing body defines a first central axis and the pre-cleaner assembly defines a second central axis laterally offset from the first central axis. Fluid flows in a first direction generally along the first central axis through the central cavity of the housing body and in a second direction opposite the first direction along the second central axis through the pre-cleaner assembly.

In an embodiment, the first central axis extends at an angle of no more than 30 degrees relative to the second axis.

In an embodiment, the first central axis is parallel to the second central axis.

In an embodiment, the cover member defines a cavity that has a first opening operably in fluid communication with the pre-cleaner assembly and a second opening downstream of the first opening operably in fluid communication with the central cavity of the housing body.

In an embodiment, a flow of fluid from the pre-cleaner assembly to the housing body through the cavity of the cover member substantially changes direction as it passes through the cavity of the cover member.

In an embodiment, the filters operably fluidly connect the second opening with the central cavity of the housing body.

In an embodiment, the pre-cleaner assembly includes a pre-cleaner body defining a cavity and one or more spin tubes located within the pre-cleaner body.

In an embodiment, when the cover member is removed, the pre-cleaner assembly remains with the housing body.

In an embodiment, the pre-cleaner assembly defines a cavity. The cavity of the pre-cleaner assembly and the central cavity of the housing body are formed from a single component.

In an embodiment, the pre-cleaner assembly defines a cavity. The cavity of the pre-cleaner assembly and the central cavity of the housing body are formed from separate component that are secured together.

In an embodiment, a method of servicing a filter system is provided. The method includes removing a cover member, which includes unbuckling a buckle from a latch tab of a filter extending beyond an axial catch of a housing body in which the filter is located. The method includes removing the filter from the housing body. The method includes inserting a new filter into the housing body. The new filter has a new latch tab. The new latch tab extends through the aperture of the housing body. The method includes securing the cover member by buckling the buckle to the new latch tab.

In an embodiment, the housing body includes an aperture through which the latch tab of the filter extends prior to being removed and through which the new latch tab extends when the new filter is inserted into the housing body.

In another embodiment, a method of servicing a filter system is provided. The method includes removing a cover member from a housing body and pre-cleaner assembly to provide access to a filter without removing any portion of the pre-cleaner. The method includes removing the filter from the housing body. The method includes inserting a new filter into the housing body. The method includes securing the cover member to the housing body.

In one method, the filter includes at least one latch tab that extends beyond an axial catch of the housing body. Removing the cover member includes unbuckling a latch that is engaged with the latch tab. The new filter includes at least one latch tab that extends beyond the axial catch when it is inserted into the housing body. Securing the cover member includes engaging the latch with the at least one latch tab of the new filter.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 17A-19 are illustrations of the housing body illustrating apertures through which latch tabs of the secondary filter extend;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
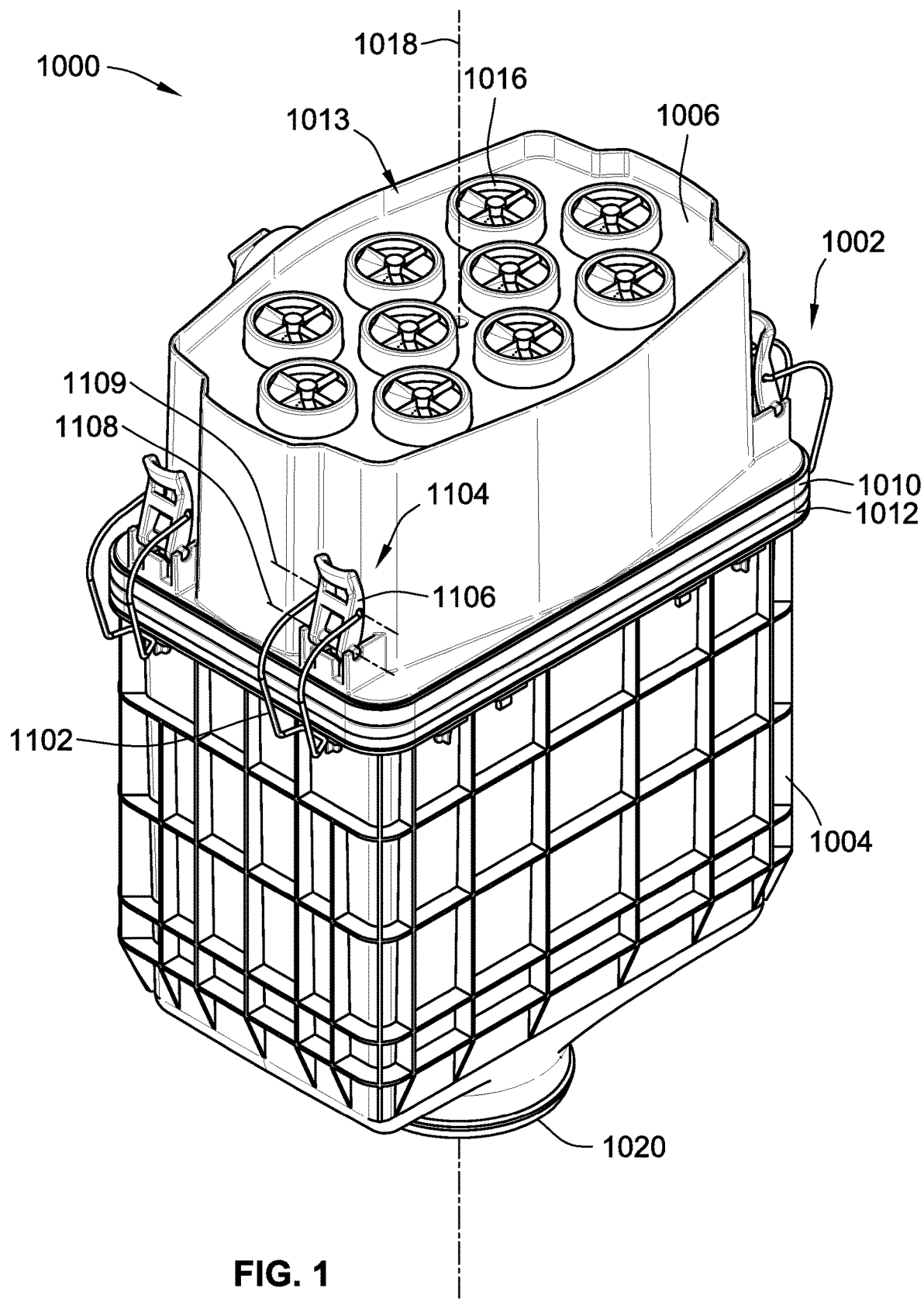
FIG. 1 is a perspective illustration of a filter system according to an embodiment of the present invention in a latched state.
Figure 2:
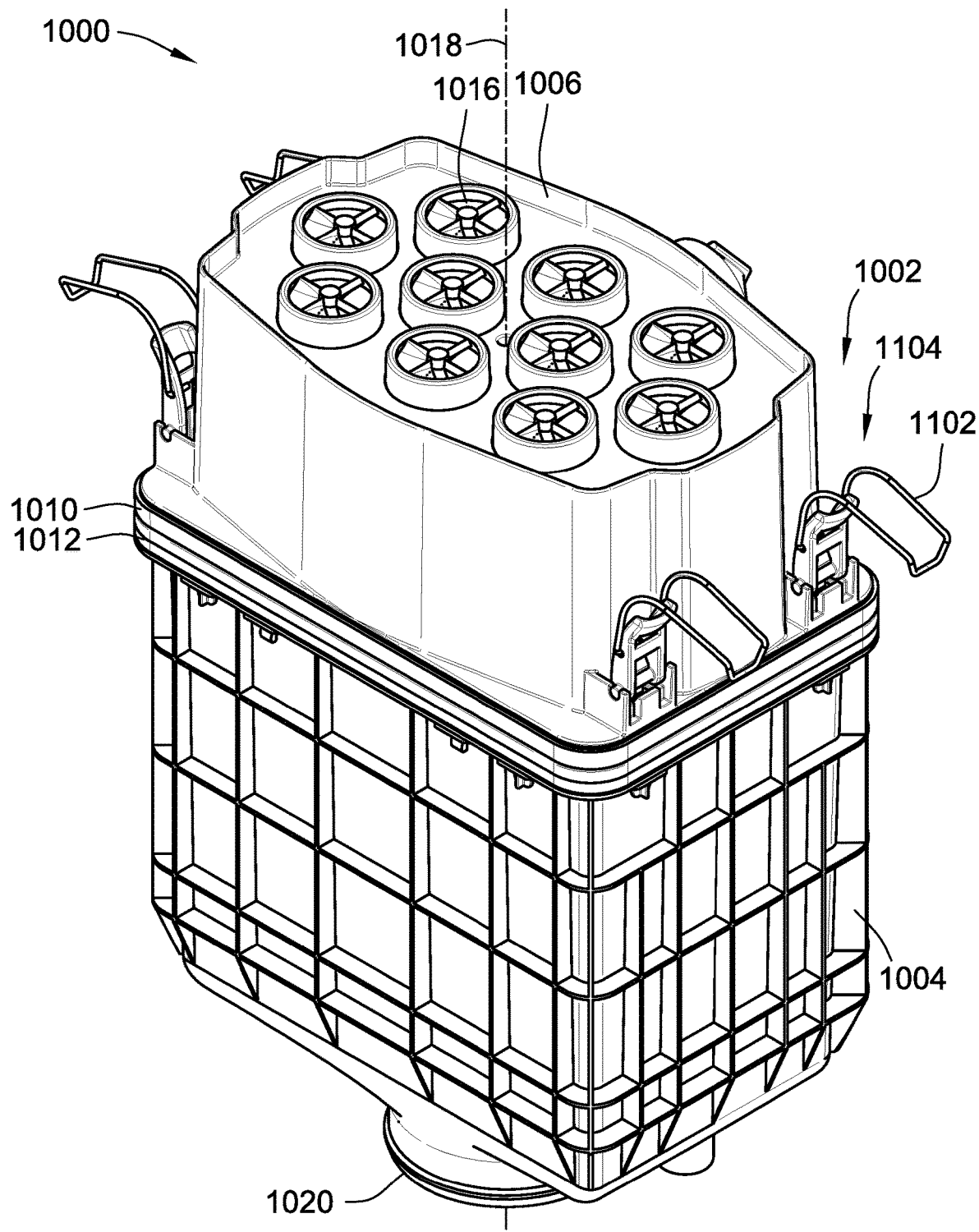
FIG. 2 is a perspective illustration of the system in an unlatched state.

FIGS. 1 and 2 are perspective illustrations of an embodiment of a filter system 1000 according to an embodiment of the invention. The filter system 1000 is used to filter a flow of fluid such as a gas or liquid to remove impurities.

Figure 3:
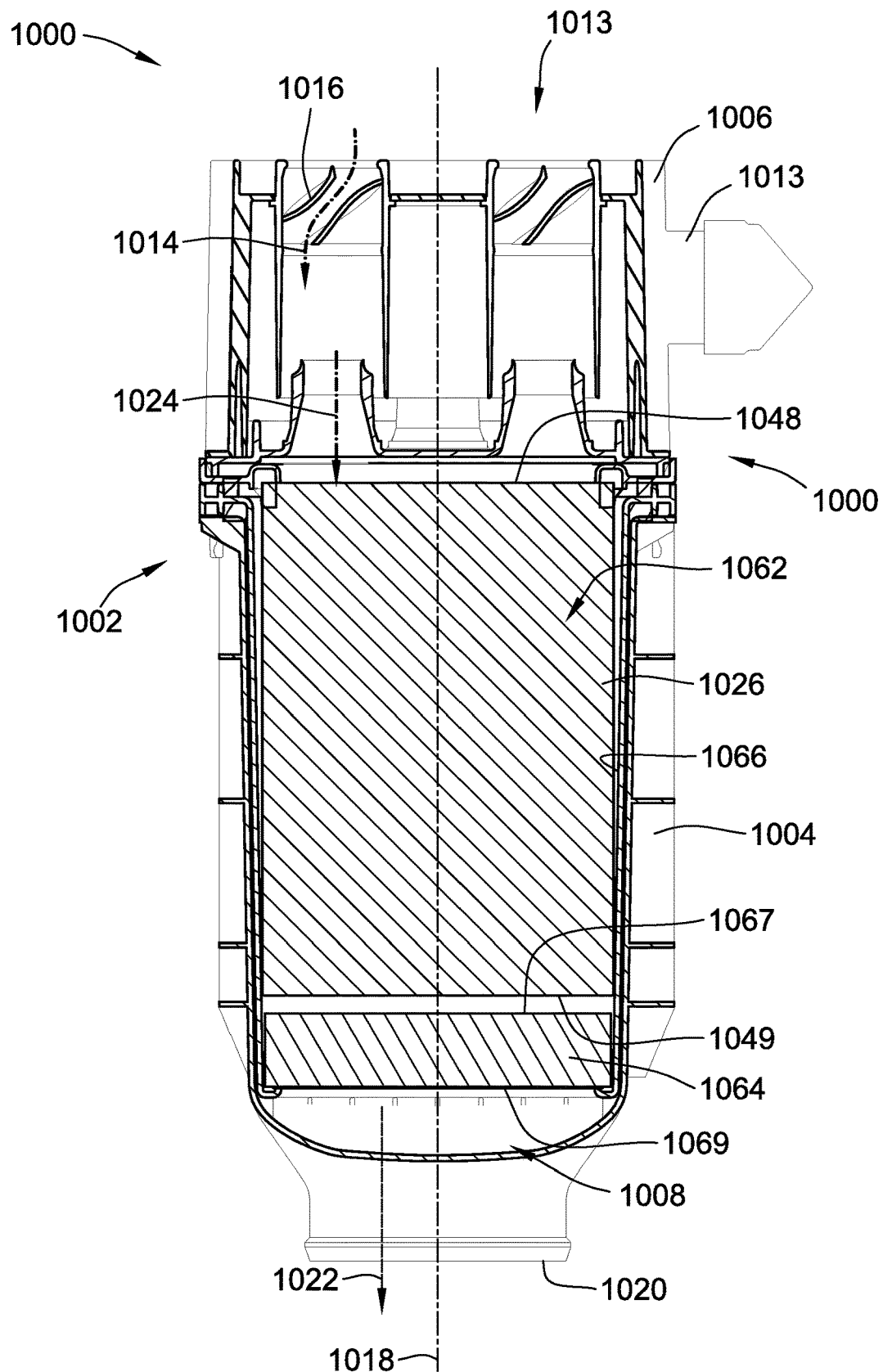
FIG. 3 is a cross-sectional illustration of the system.
Figure 4:
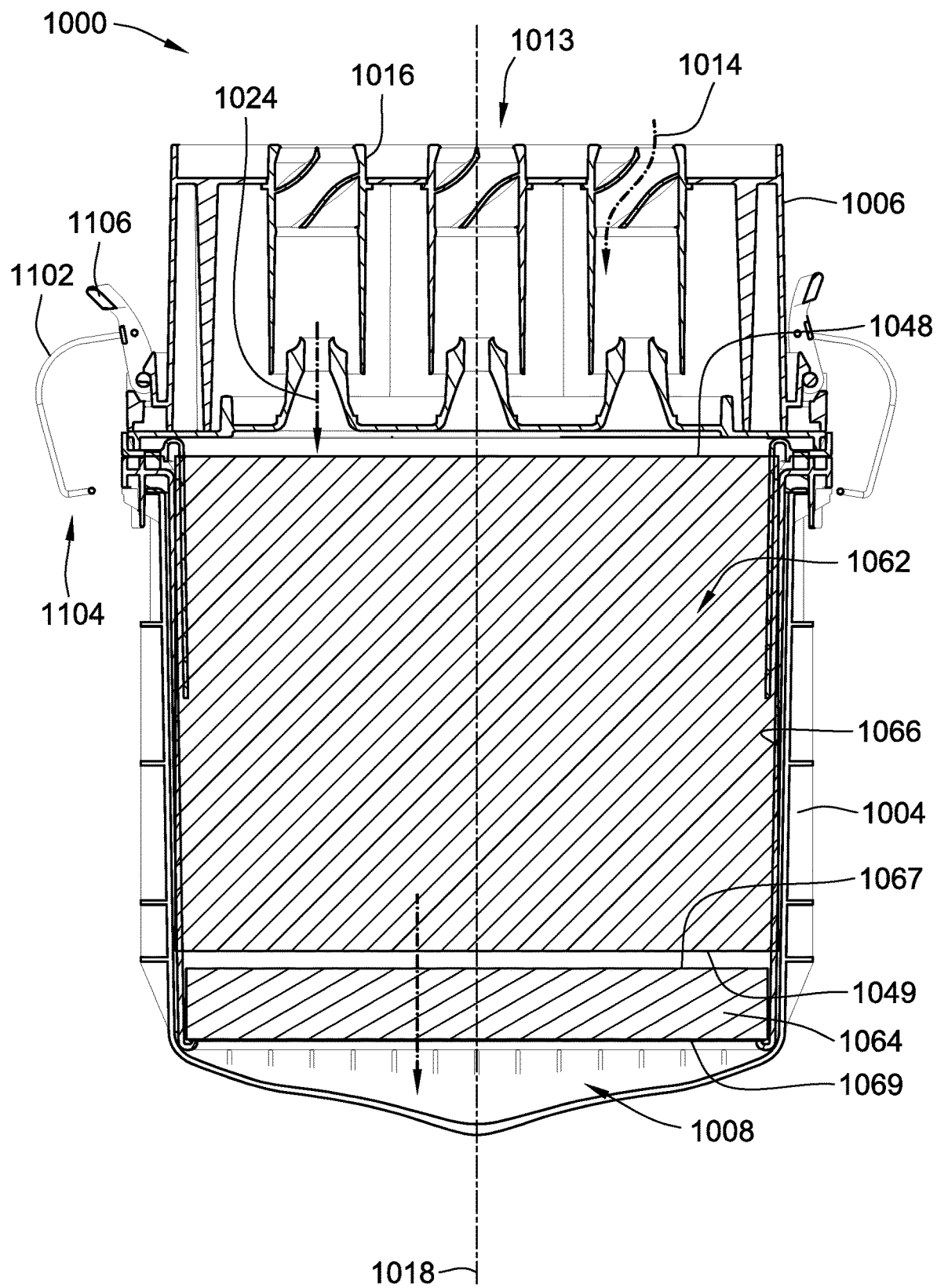
FIG. 4 is a cross-sectional illustration of the system.

With additional reference to FIGS. 3 and 4, the filter system 1000 generally includes a filter housing 1002 that includes a housing body 1004 and a housing cover member 1006. The housing 1002 will generally define a central cavity 1008 (see FIGS. 3 and 4) in which first and second filters 1010, 1012 (also referred to as filter elements or filter cartridges) are operably located and secured. The first and second filters 1010, 1012 are located and positioned relative to one another and the housing components such that as the fluid flows through the housing 1002 the fluid must pass through filter media of the filters 1010, 1012 to remove impurities (e.g. the fluid is not allowed to bypass the filter media as it flows through the housing 1002).

In the illustrated embodiment, fluid to be filtered enters the filter system 1000 through an inlet 1013 defined by the cover member 1006 illustrated by arrow 1014. The illustrated cover member 1006 includes a precleaner mechanism for performing an initial cleaning of the fluid. The precleaner mechanism in the illustrated embodiment is illustrated in the form of a plurality of spin tubes 1016 that cause the fluid to spin as it moves axially through the filter system 1000 along/generally parallel to central axis 1018 of the filter system 1000. The spinning motion of the fluid can be used to separate larger particles from the flow of fluid. The precleaner mechanism and corresponding spin tubes 1016 are upstream of the filters 1010, 1012 such that the larger particles never reach the first and/or second filters 1010, 1012.

Typically, the outlet ends of the spin tubes will have a radially outer portion that fluidly communicates with a vent 1013 (FIG. 3) for venting the filter impurities out of the cover member and a separate portion that fluidly communicates the prefiltered fluid to the filters 1010, 1012. Heavier particles will move radially outward in the spinning fluid and be separated from cleaner radially inward fluid. The larger particles will be spun radially outward within the spin tubes 1016 while the cleaned, lighter, air illustrated by arrow 1024, will pass through a central aperture radially inward of the outer walls of the spin tubes 1016 and onto the filter. In the illustrated embodiment, the cover and precleaner mechanism are formed from separate components that may or may not be permanently attached to one another, e.g. by an adhesive that could additionally seal the two components together.

While the illustrated embodiment includes a cover member with a precleaner mechanism, other embodiments are contemplated where no such precleaner mechanism, or even a cover member, is provided. Further, other embodiments may use more or less spin tubes. Additionally, the spin tubes may be a removable component from the cover member such that they can be cleaned or otherwise replaced. If multiple spin tubes are provided, they could be removed independently or as a group. Further, other precleaner mechanisms are contemplated to be provided other than spin tubes.

After the fluid passes through the filters 1010, 1012, the fluid exits the housing 1002 through an outlet 1020 of the housing body 1002 illustrated by arrow. The cleaned fluid can then travel to downstream components such as an internal combustion engine, turbine, etc.

Figure 7:
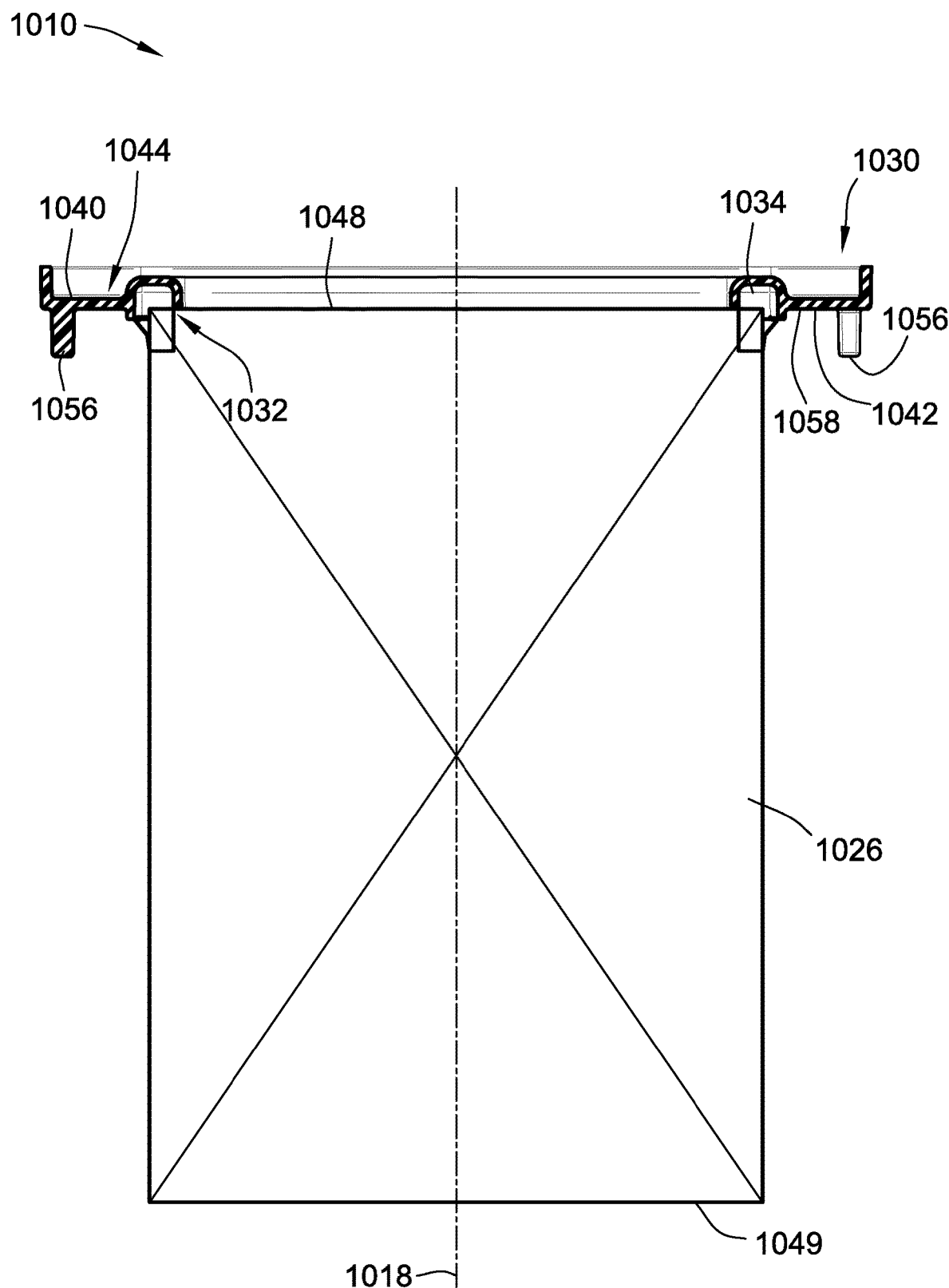
FIG. 7 is a cross-sectional illustration of the primary filter of the system.
Figure 8:
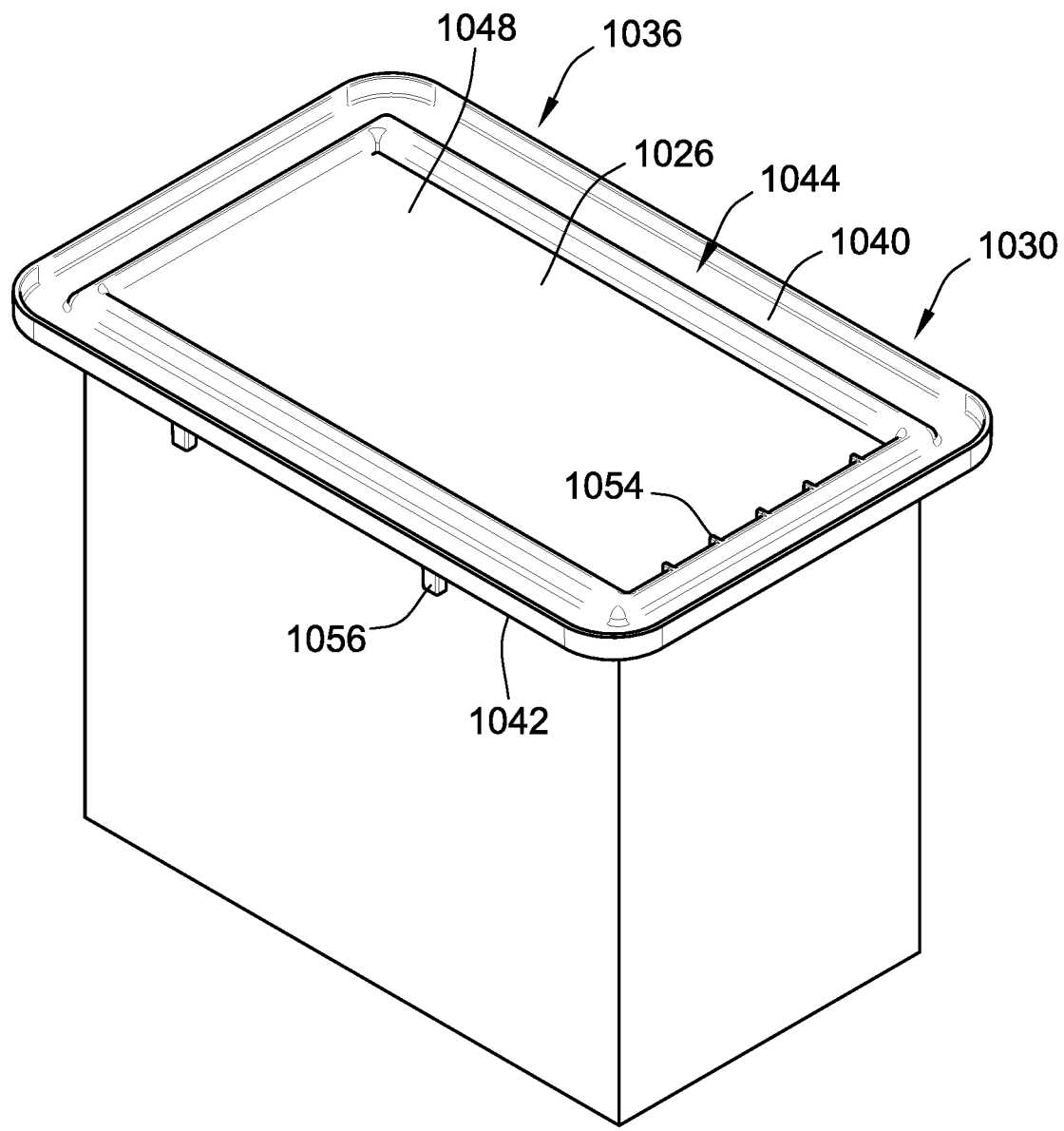
FIGS. 8 and 9 are perspective illustrations of the primary filter.
Figure 9:
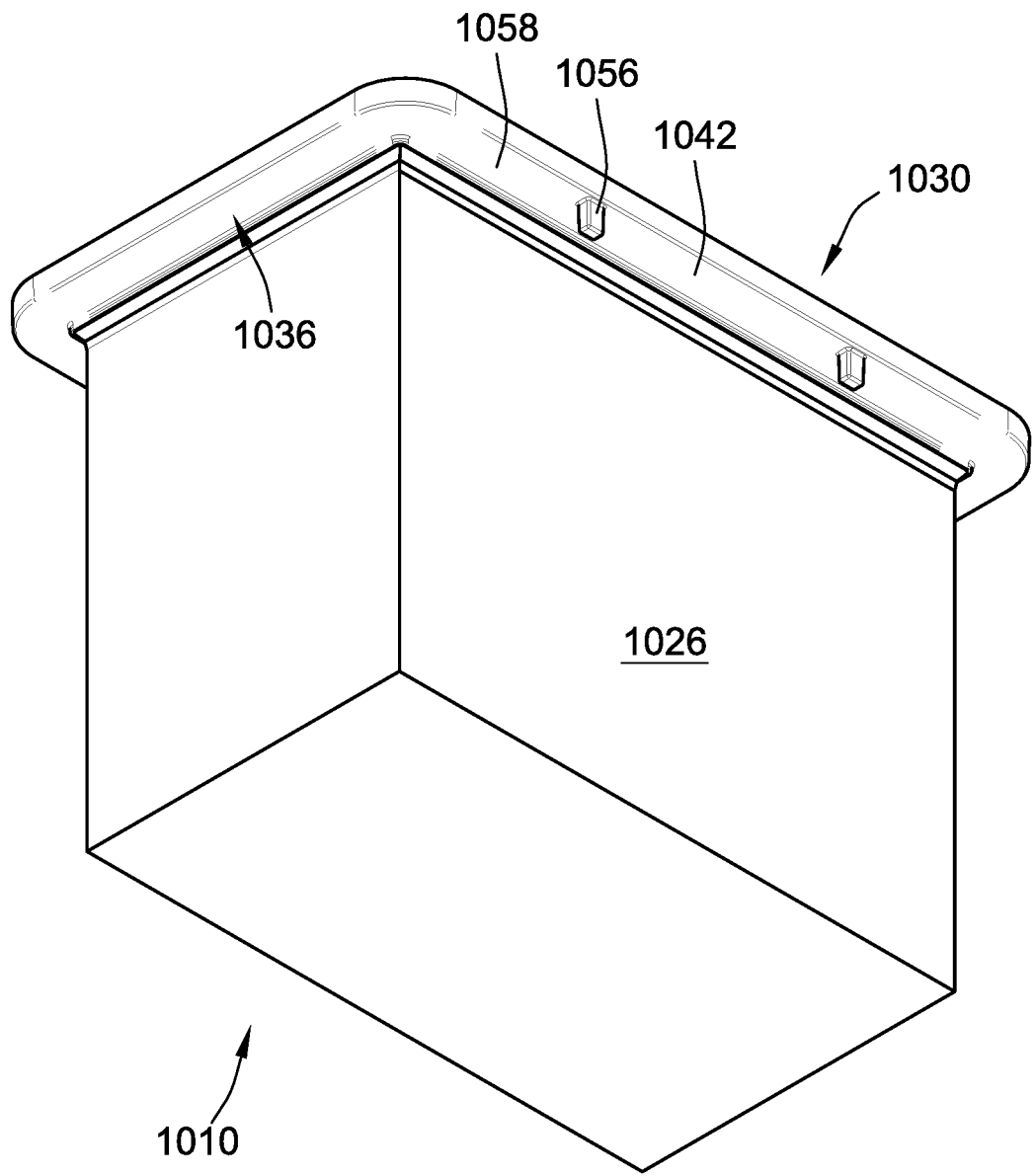

After passing through the precleaner mechanism (e.g. spin tubes 1016) the fluid passes through first filter 1010, which is often referred to as a primary filter 1010. With additional reference to FIGS. 7 and 9, the primary filter 1010 includes a primary filter media pack 1026, which is configured to further remove impurities from the flow of fluid. In some embodiments, the primary filter media pack 1026 may be formed from pleated filter media, fluted filter media or other types of filter media. Particular filter media and methods of forming filter media and filter media packs for use in embodiments of the present invention are disclosed in U.S. patent application Ser. No. 62/243,740 filed on Oct. 20, 2015 assigned to the assignee of the instant application, the teachings and disclosures of which is incorporated herein by reference thereto in their entireties for all purposes.

With reference to FIGS. 5-10, the primary filter 1010 includes a frame member in the form of a border frame 1030 operable attached to the filter media pack 1026. The border frame 1030 is attached to the filter media pack 1026 in a sealing manner to prevent fluid bypass between the border frame 1030 and the filter media pack 1026. In the illustrated embodiment, the border frame 1030 includes a channel 1032 that receives an adhesive 1034 that secures the border frame 1030 to the filter media pack 1026 and also prevents fluid bypass (see e.g. FIGS. 5-7). In some embodiments, the adhesive 1034 may be a urethane material and more particularly a rigid or foamed urethane. Other adhesives such as hotmelt adhesives are contemplated.

The channel 1032 and adhesive 1034 generally extends about the periphery of the filter media pack 1026 to attach the border frame 1030 to the filter media pack 1026.

The border frame 1030 includes a radially outward extending portion that forms a press flange 1036 that extends radially outward relative to central axis 1018 beyond an outer periphery of the filter media pack 1026. The press flange 1036 preferably extends at least 0.25 inches beyond the outer periphery of the filter media pack 1026, more preferably at least 0.5 inches, more preferably at least 0.75 inches. However, the press flange 1036 can extend greater than 1 inch from the outer periphery of the filter media pack 1026 in the radial direction relative to central axis 1018. The press flange 1036 will typically extend less than 0.75 inches beyond the outer periphery of the filter media pack 1026.

The press flange 1036 has a first side 1040 (inlet side) and a second side 1042 (outlet side). The first and second sides 1040, 1042 are generally opposite one another. The inlet side 1040 generally axially faces the cover member 1006 when the first filter 1010 is installed in the housing 1002 and the second side 1042 generally axially faces away from the cover member 1006 and towards the outlet end of the housing body 1004.

The first side 1040 provides a cover press region 1044 against which a press portion, illustrated in the form of axially extending flange 1046, of the cover member 1006 is axially pressed when the filter system 1000 is fully assembled. The cover press region 1044 and press portion of the cover member 1006 are radially outward of the central cavity of the housing body 1004 of housing 1002.

While no seal is illustrated between the cover 1006 and border frame 1030, in some embodiments, a seal member may be so provided. In some embodiments, the seal member is in the form of a lip seal between the cover member 1006 and border frame 1030. For instance, a radial seal could be formed between axially extending flange 1046 and the outer axially extending flange at the outer periphery of the press flange 1036. Alternatively, a seal could be located directly axially between axially extending flange 1046 and first side 1040 of the press flange 1036. The seal could be in the form of a preformed gasket or a molded in place gasket. If a preformed gasket is used, the gasket could be glued to the cover member 1006 or the primary border frame 1030. Alternatively, it could not be adhesively adhered to either component. Because this interface is upstream of the filter media, this seal is optional.

The filter media pack 1026 defines a first face 1048, which in the illustrated embodiment is an inlet face. The filter media pack 1026 also defines a second face 1049, which in the illustrated embodiment is an outlet face. (see e.g. FIGS. 3, 4 and 7). The first face 1048 of the filter media pack 1026 is axially recessed relative to the cover press region 144 of the first side 1040 of the press flange 1036 (see e.g. FIG. 6). In the illustrated embodiments, the first and second faces are transverse to central axis 1018 and even more particularly orthogonal to the central axis 1018.

Figure 10:
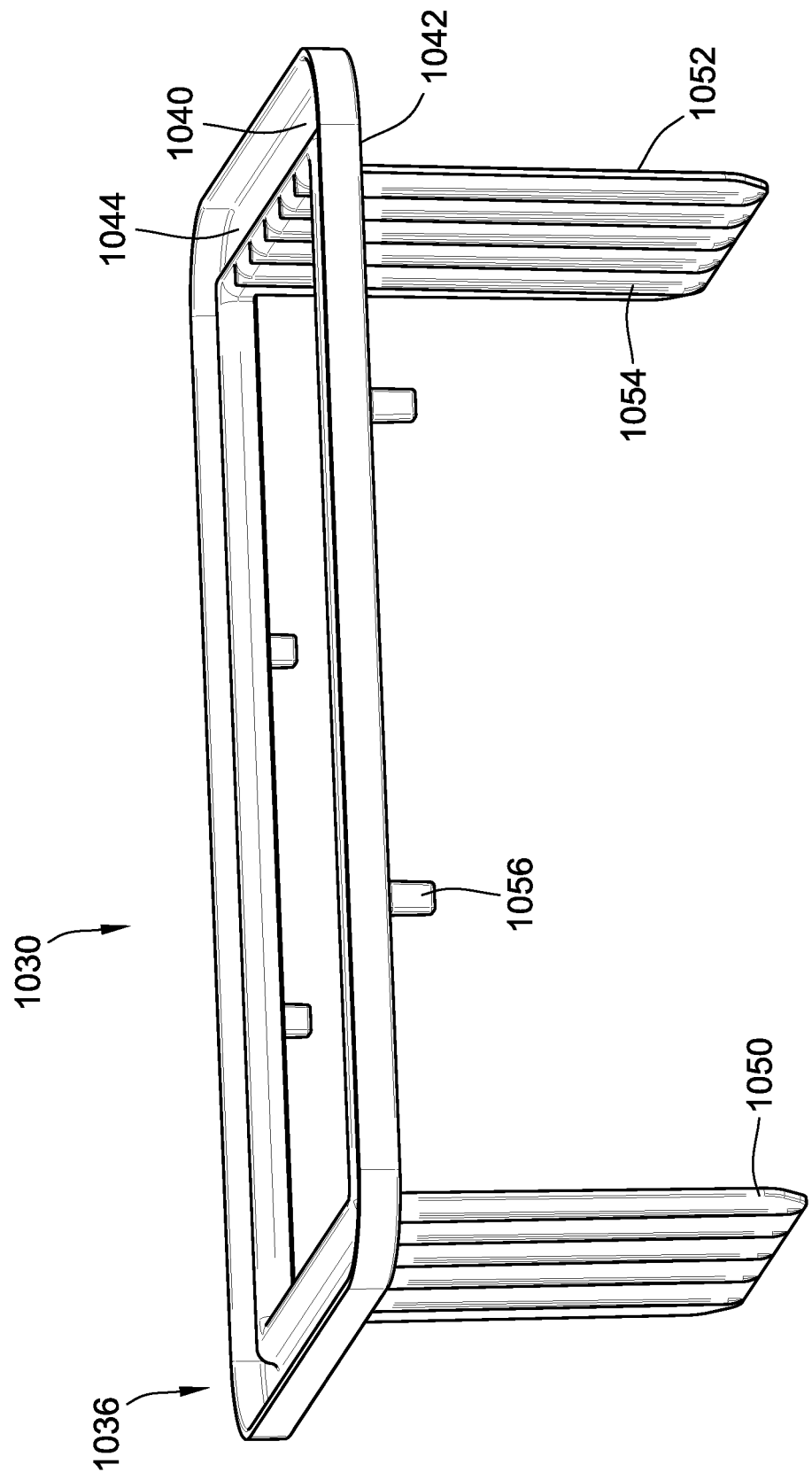
FIG. 10 is a perspective illustration of the border frame of the primary filter.

With reference to FIG. 10, the border frame 1030 includes a pair of axially downward depending sidewalls 1050, 1052 that assist in supporting and locating the filter media pack 1026 during assembly of the first filter 1010. Each of the sidewalls 1050, 1052 may extend in between adjacent panels of the filter media pack 1026 if the filter media pack 1026 is formed using a pleated/folded type media and depending on the orientation of the panels of the filter media pack 1026.

The sidewalls 1050, 152 include inward extending ribs 1054 that can provide further rigidity. Ribs 1054 may extend in between adjacent panels of the filter media pack 1026 such as if pleated/folded type media is used. Further, the ribs 1054 could extend into grooves formed between adjacent flutes if fluted filter media is incorporated.

The border frame 1030 also includes a plurality of axially extending features 1056 which can be used for locating the primary filter 1010 relative to the secondary filter 1012 when inserting the primary filter 1010 into the filter system 1000 and particularly into the second filter 1012. The axially extending features 1056 may have a slight taper as they extend towards the distal end thereof to assist in alignment of the primary and secondary filters 1010, 1012 during assembly and at maintenance intervals. The features 1056 on one side of the border frame 1030 may be spaced a different distance than features 1056 on the opposite side such that the orientation of the primary filter 1010 is proper when the primary filter 1010 is installed. Such axially extending features 1056 also advantageously aid in the installation of the primary filter 1010 into the secondary filter 1012 when the system herein is in a non-horizontal orientation, e.g. as a result of its installed orientation on a vehicle, or when the vehicle is on an incline.

The second side 1042 of the press flange 1036 defines a seal surface 1058 that cooperates with a first seal member 1060 (shown overlapped in the present drawings) to seal the primary filter 1010 to the secondary filter 1012. The seal surface 1058 is positioned radially between axially extending features 1056 and channel 1032 of the border frame 1030. When assembled, the cover member 1006, via press portion 1046, presses on first side 1040 of the press flange 1036 to press the second side 1042 and particularly seal surface 1058 axially into first seal member 1060 to form a seal.

The primary filter 1010 may be referred to, in some embodiments, as being seal free as the primary filter 1010 does not include any seal member affixed thereto in some embodiments. However, other embodiments may have seal member 1060 attached to border frame 1030. This could be done mechanically such as an interlocking relationship, adhesively or by molding the seal member 1060 directly to the border frame 1030.

Figure 17:
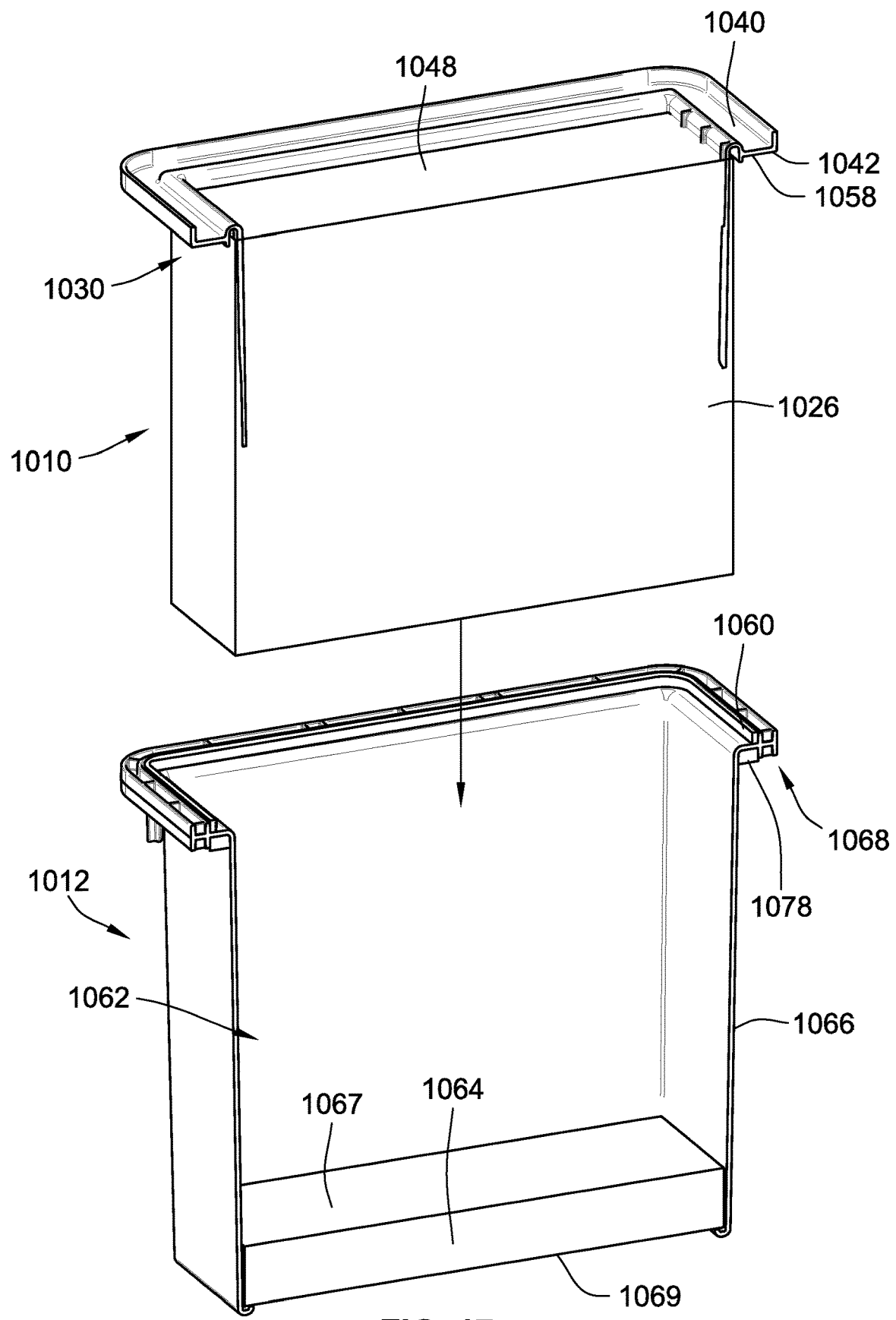
FIG. 17 is a cross-sectional illustration of the primary and secondary filters illustrating that the primary filter is received into a cavity of the secondary filter.

With reference to FIGS. 3, 4 and 17, the primary filter 1010 and secondary filter 1012 are configured such that the primary filter 1010 is axially received within a central cavity 1062 (also referred to as a filter receiving chamber) of the secondary filter 1012 when the filter system 1000 is fully assembled.

The second filter 1012 (also referred to as a secondary filter) includes a second filter media pack 1064 sealingly attached to a frame member that includes a casing member 1066 (also referred to as a casing portion). The casing member 1066 is sealingly secured to the filter media pack 1064. With reference to FIGS. 3, 4, 12 and 17, the second filter media pack 1064 defines an inlet flow face 1067 (first face) and a downstream outlet flow face 1069 (second face). In the illustrated embodiments, the first and second faces 1067, 1069 are transverse to central axis 1018 and even more particularly orthogonal to the central axis 1018. The second filter media pack 1064 could be in the form of pleated media, a block of media, e.g. foam.

With principle reference to FIGS. 3-6 and 13, the secondary filter 1012, and particularly the frame member, includes a seal support flange 1068 that extends radially outward from the casing member 1066. The seal support flange 1068 has a first inlet side 1070 that generally faces cover member 1006 and border frame 1036 when assembled and a second outlet side 1072 opposite the inlet side 1070. The inlet side 1070 defines a seal surface 1074 against which first seal 1060 axially seals when the system 1000 is fully assembled. Outlet side 1072 defines a seal surface 1076 against which a second seal 1078 seals to seal the seal support flange 1068, and consequently the secondary filter 1012, to the housing body 1004.

Figure 14:
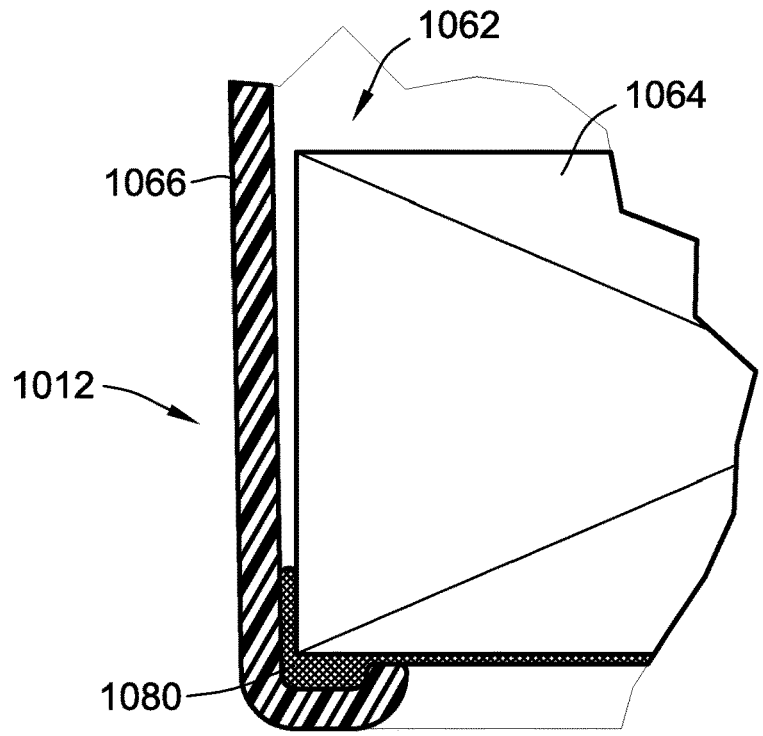

As illustrated in FIG. 14, second media pack 1064 is sealingly engaged with casing member 1066 to prevent fluid bypass between casing member 1066 and filter media pack 1064. A seal member 1080 may be provided to promote the sealing relationship. The seal member 1080 could be an adhesive such as a foamed urethane or other known adhesive material to secure the second media pack 1064 to the casing member 1066.

Figure 5:
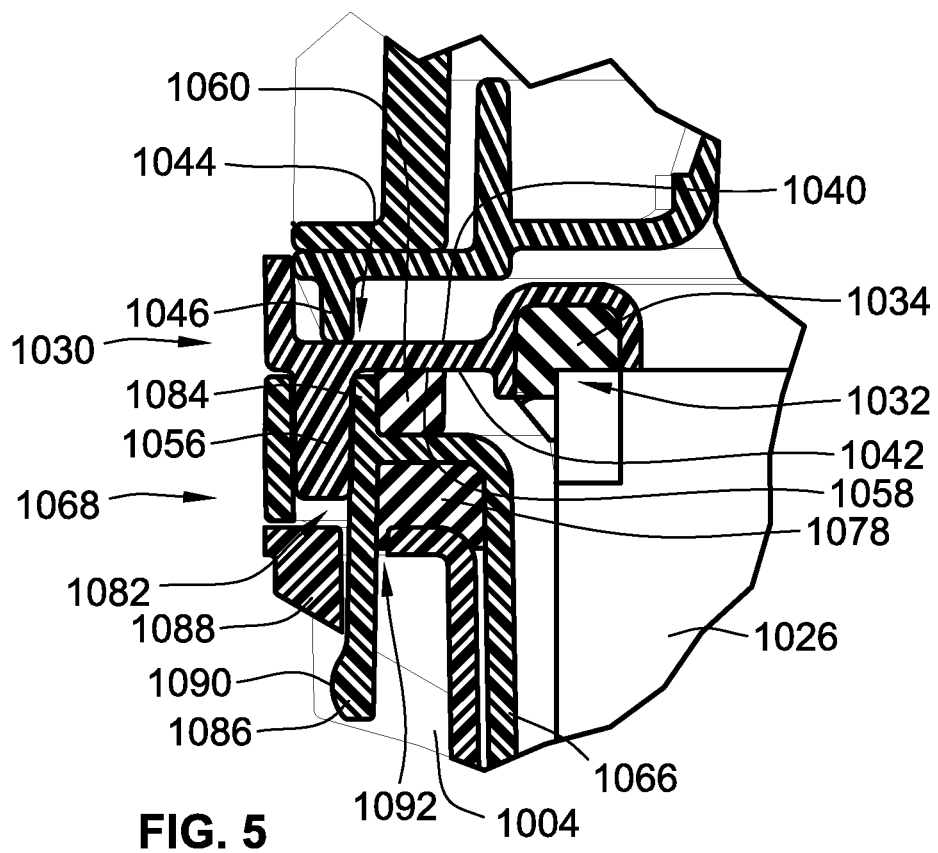
FIGS. 5 and 6 are enlarged cross-sectional illustrations of the sealing interface of the system.
Figure 13:
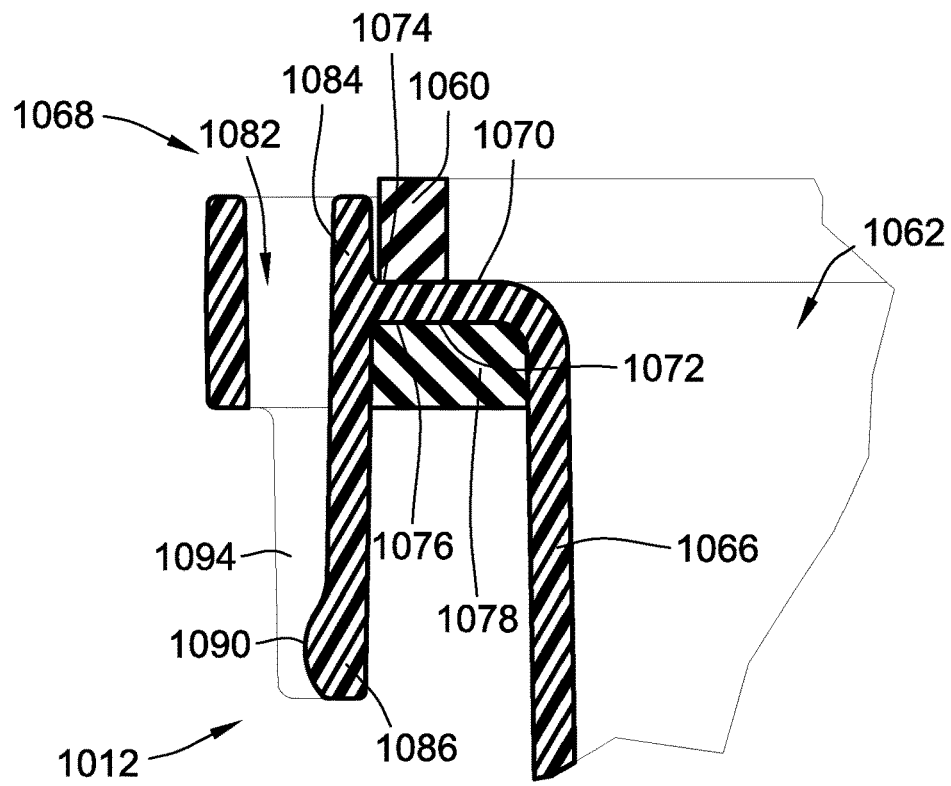
FIGS. 13 and 14 are enlarged, partial, cross-sectional illustrations of the secondary filter.

With reference to FIGS. 5 and 13, the seal support flange 1068 defines slots 1082 that receive features 1056 when assembled to properly locate the primary filter 1010 relative to the secondary filter 1012 during assembly and to promote improved alignment of seal 1060 between press flange 1036 and seal support flange 1068.

Axially outward extending annular flange 1084 extends axially outward from the inlet side 1070 of the seal support flange 1068. The flange 1084 radially locates seal 1060. Further flange 1084 may press axially against the press flange 1036 of the primary filter 1010 when in an assembled state.

Figure 11:
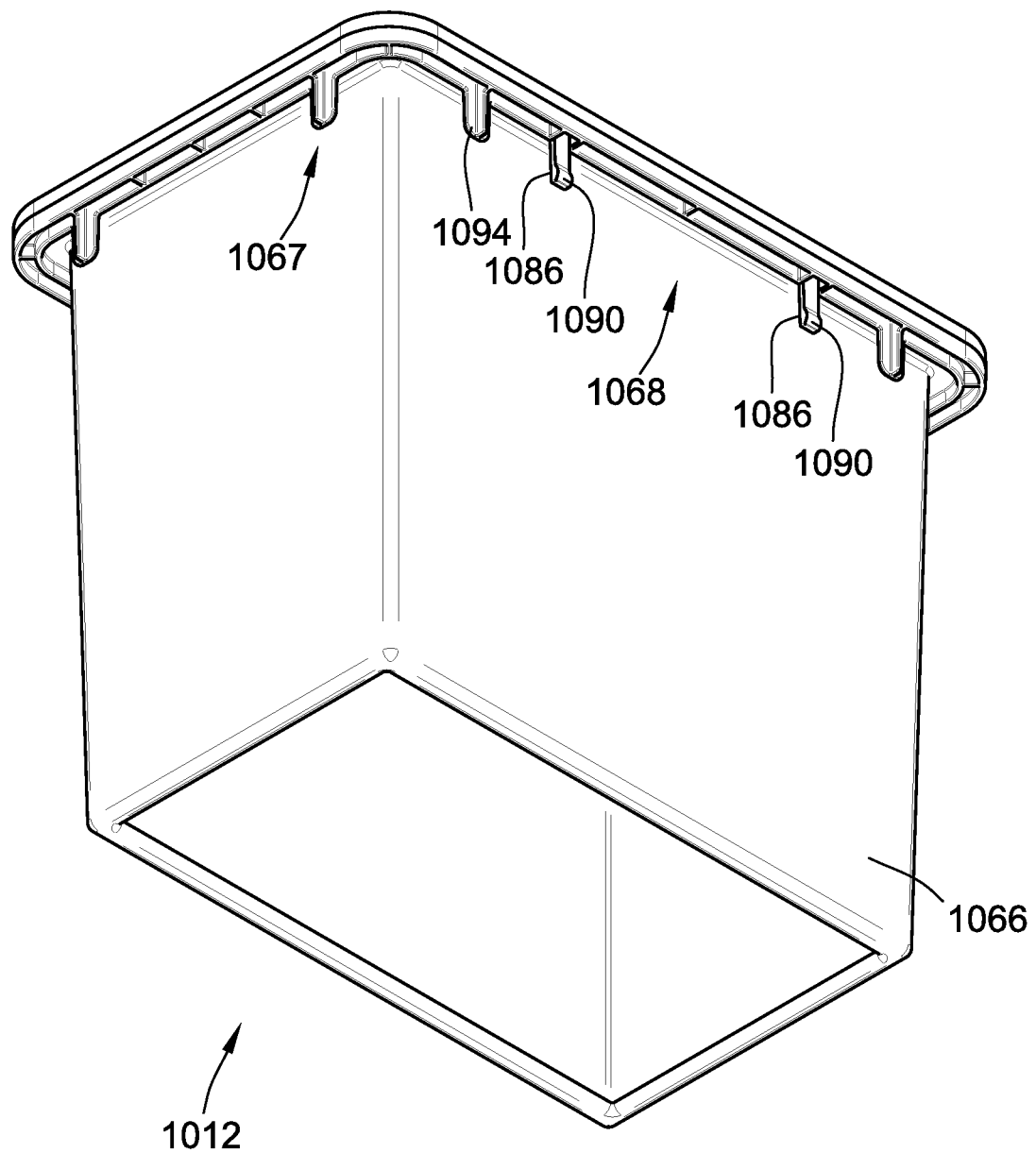
FIG. 11 is a perspective illustration of the secondary filter.
Figure 12:
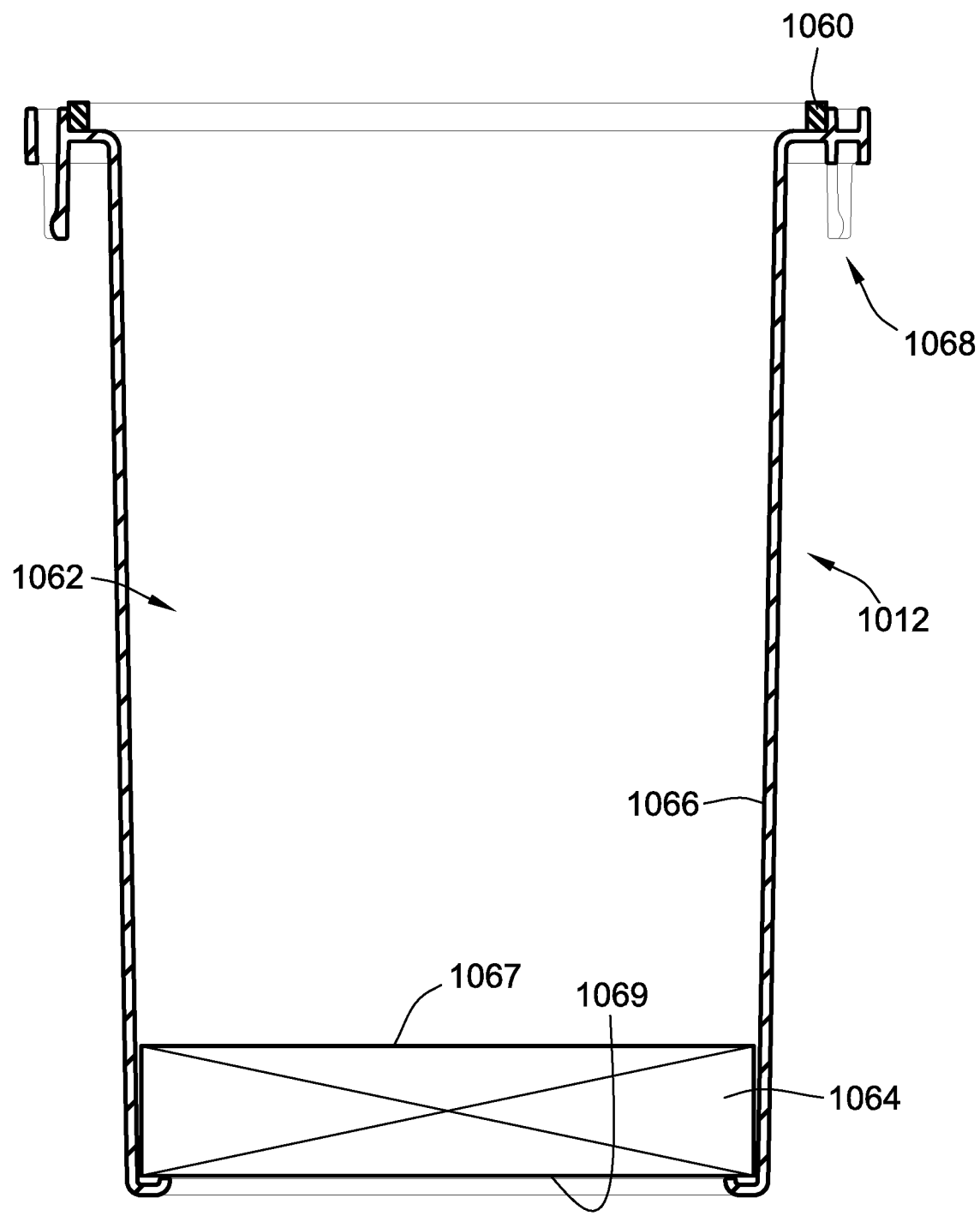
FIG. 12 is a cross-sectional illustration of the secondary filter.

With reference to FIGS. 5, 11 and 13, a plurality of axially extending catch tabs 1086 extend axially from the seal support flange 1068 and extend axially through and engage a radially extending peripheral support flange 1088 that extends radially outward from a sidewall of the housing body 1004 (see FIGS. 5, 6 and 13) when the secondary filter element is fully located within central cavity 1008. The catch tab 1086 has a radially extending nib 1090 that axially engages the peripheral support flange 1088 of the housing body 1004. The nibs 1090 provide an axial locking of the seal support flange 1068, and thus the secondary filter element 1012, to the peripheral support flange 1088. The nibs 1090 are proximate a distal end of the catch tabs 1086.

Seal 1078 is positioned radially between casing member 1066 and catch tabs 1086. Engagement of nibs 1090 with peripheral support flange 1088 can provide a visual indicator to an installer that the secondary filter 1012 is properly seated relative to housing 1002.

Figure 17A:
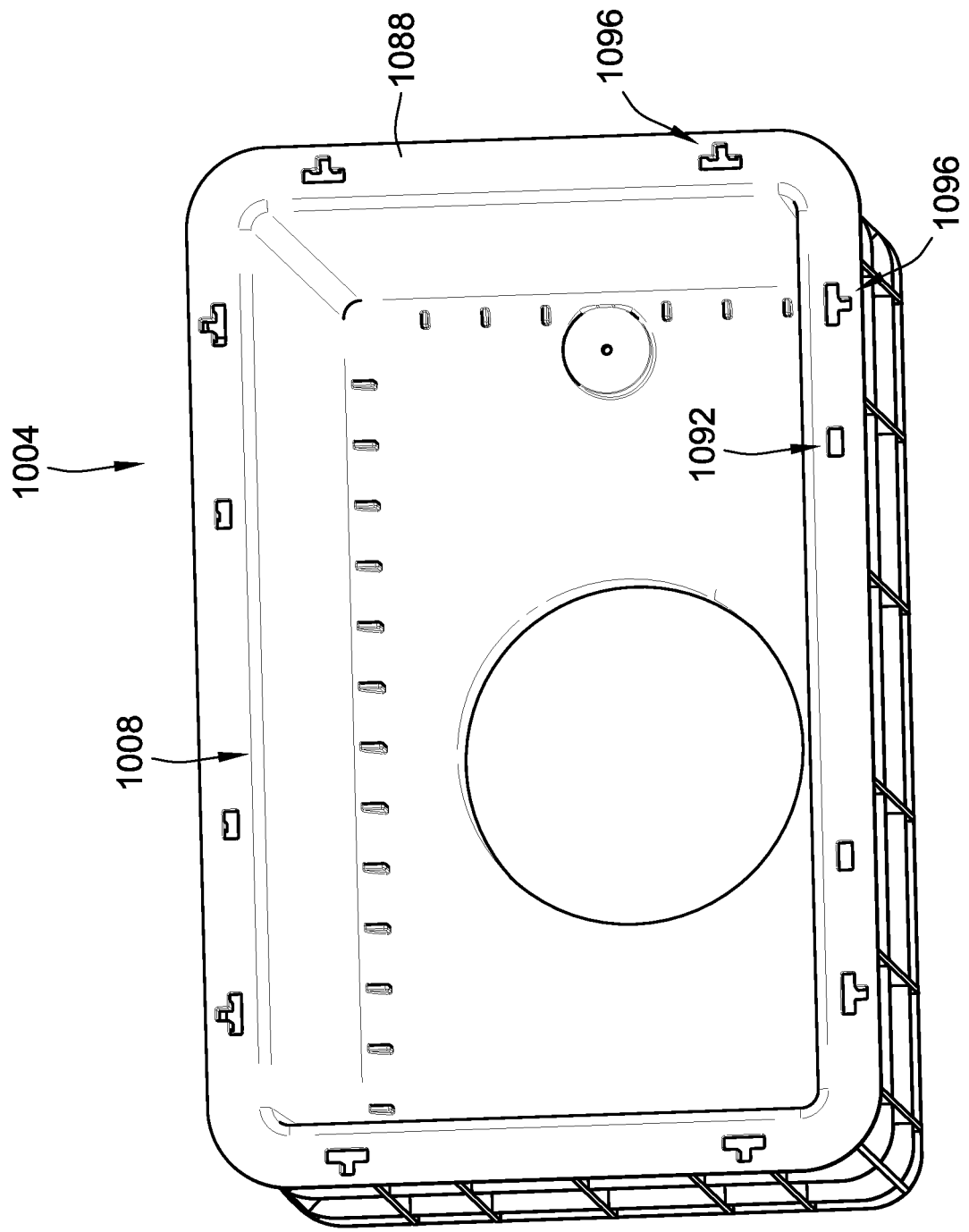
Figure 18:
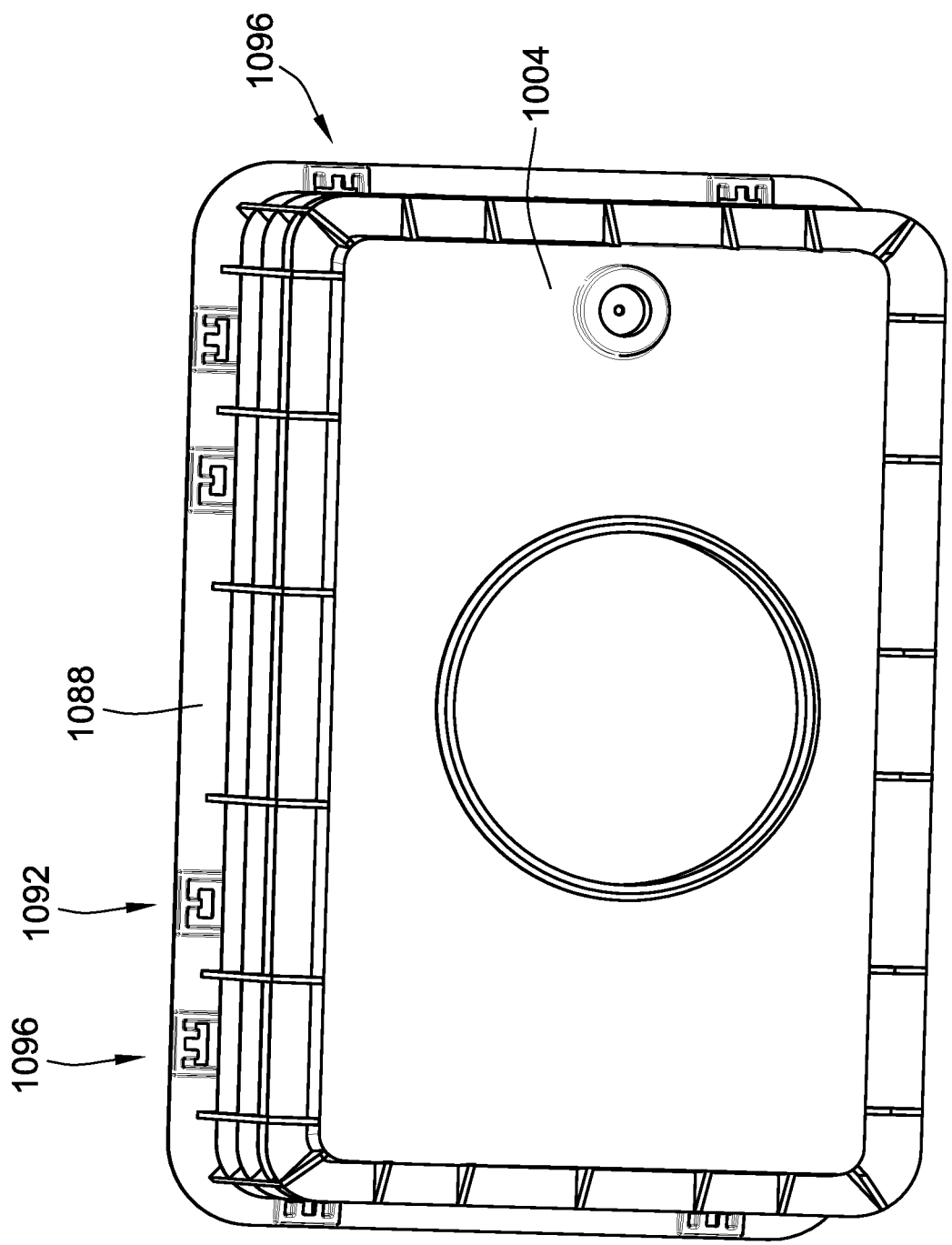
Figure 19:
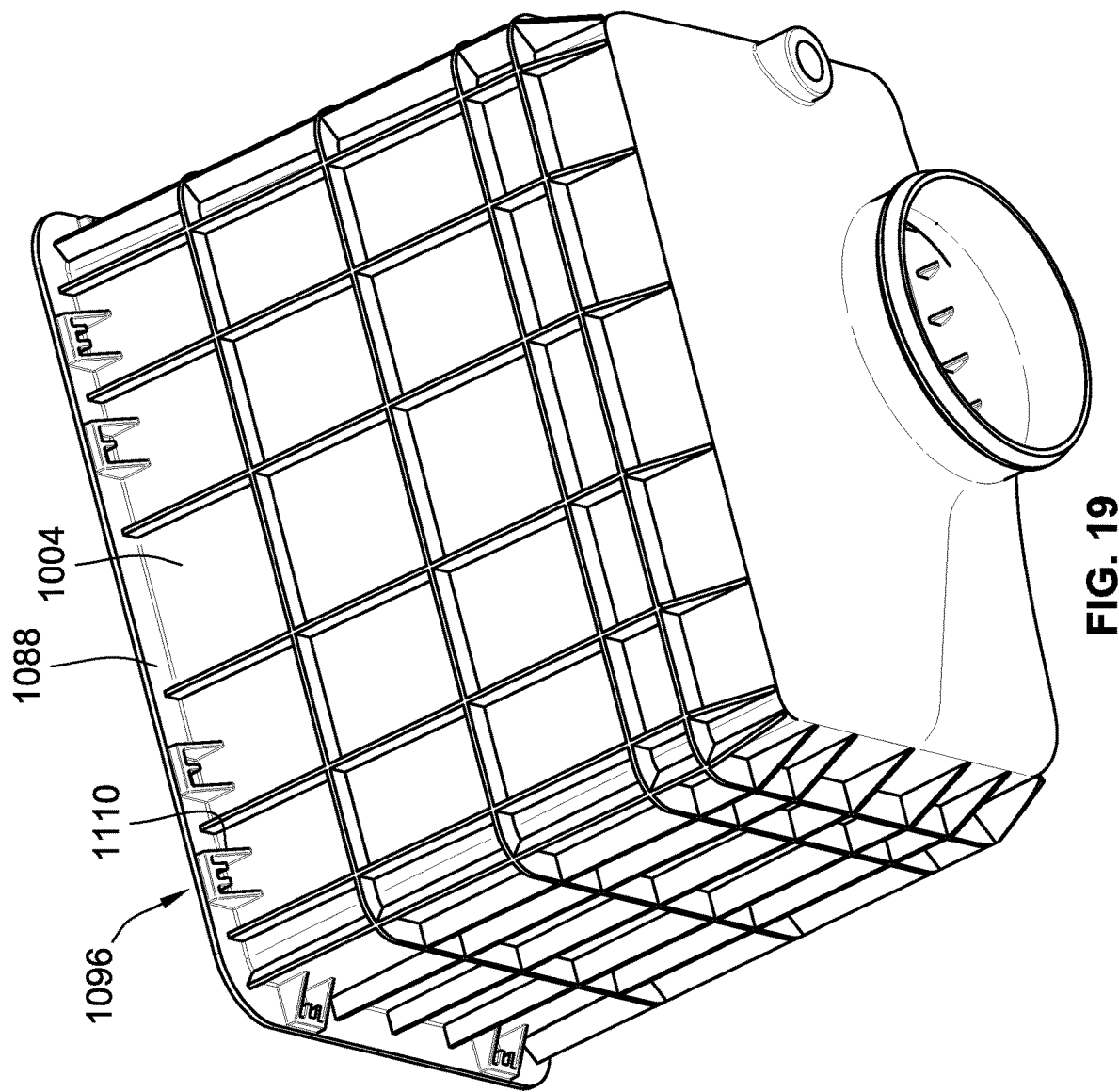
Figure 20:
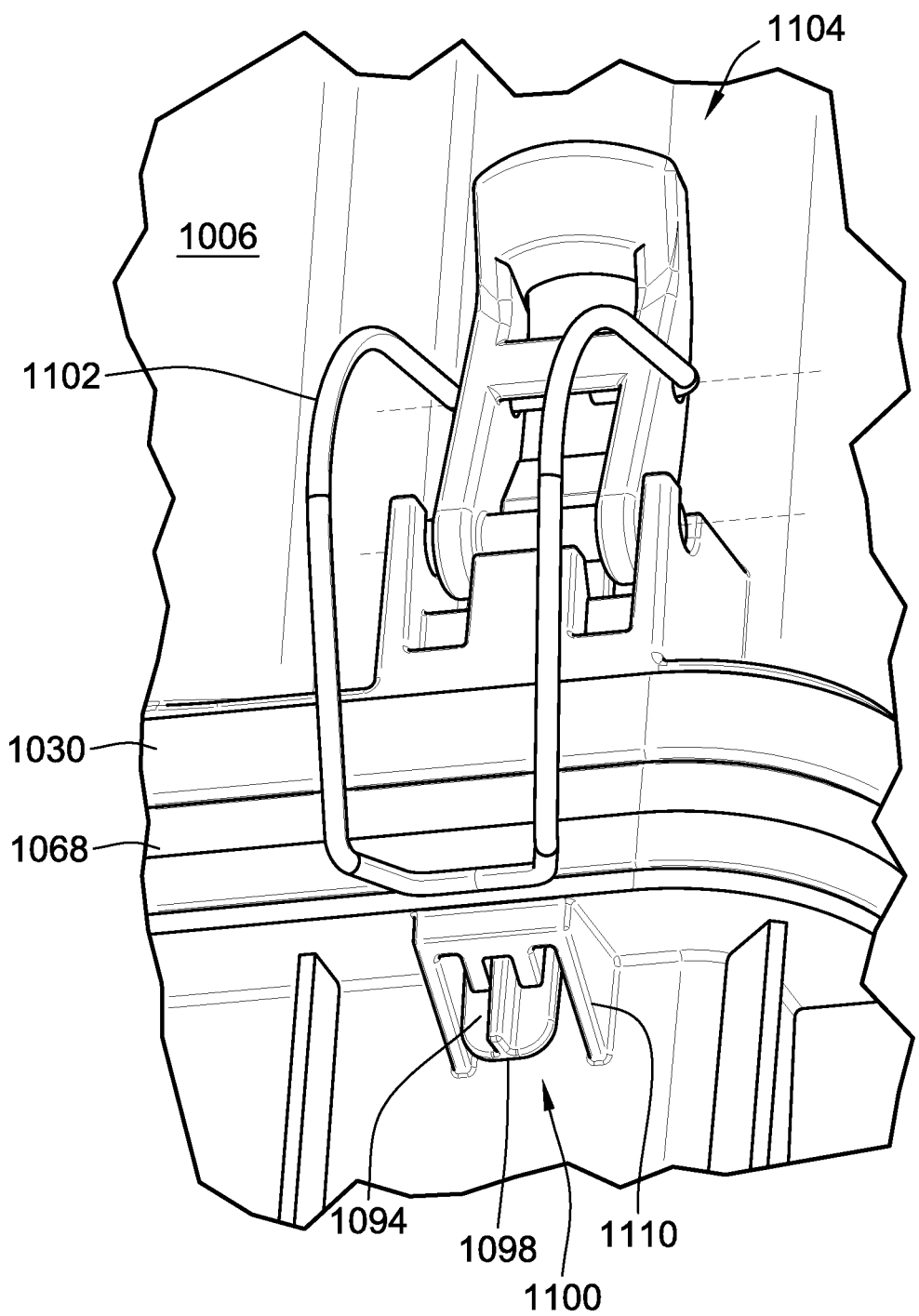
FIG. 20 is a further perspective illustration of the latch arrangement of the filter system.

The catch tabs 1086 extend through slots 1092 in the peripheral support flange 1088. FIG. 17A illustrates slots 1092.

Figure 6:
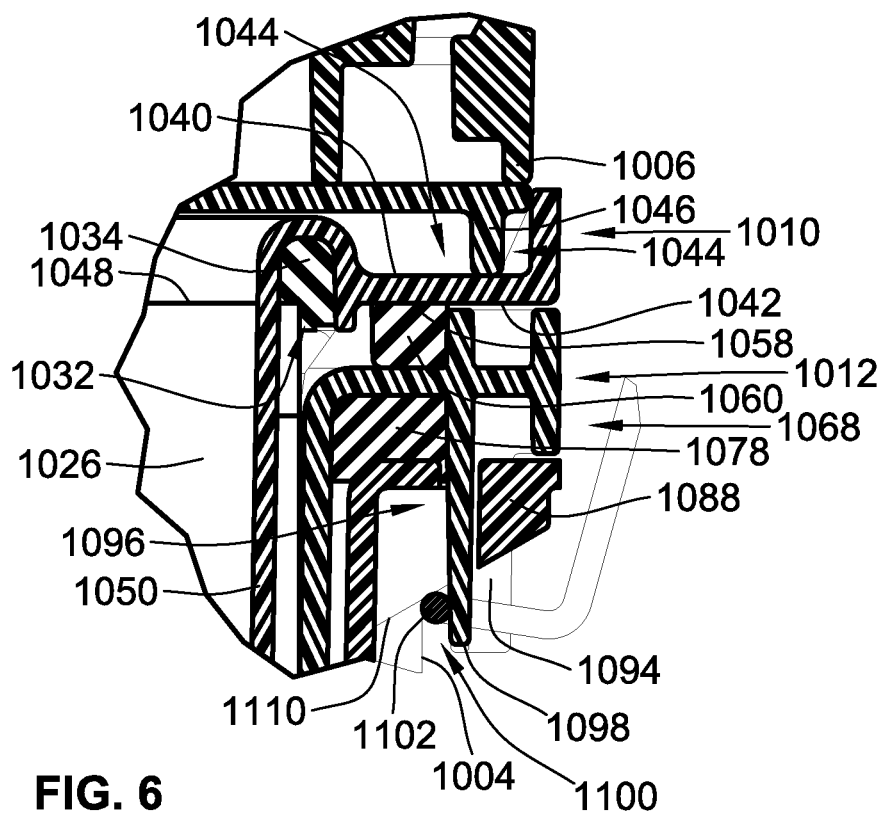
Figure 15:
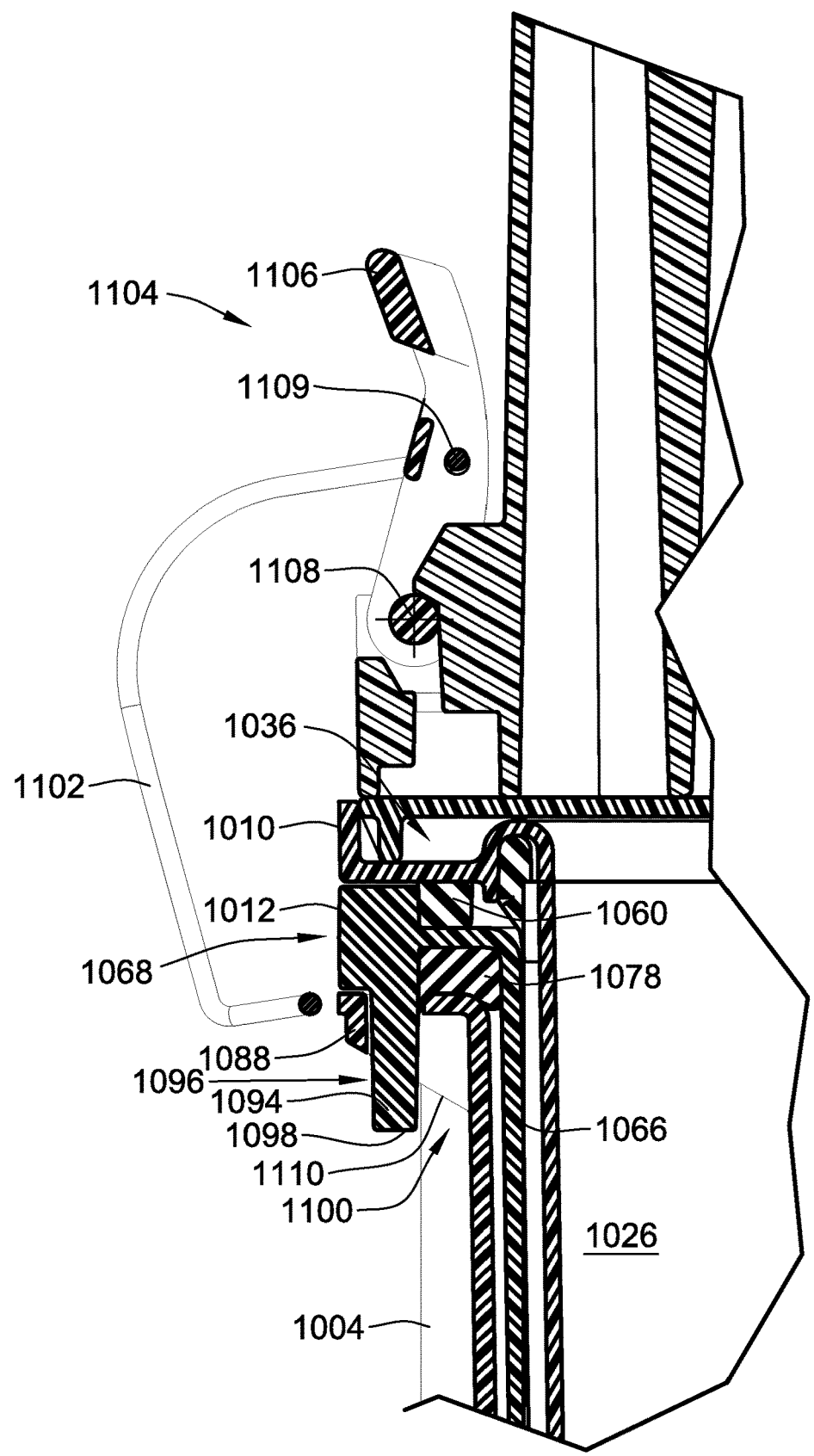
FIG. 15 is an enlarged cross-sectional illustration of the latch arrangement of the filter system in an unlatched state.

In addition to the axially extending catch tabs 1086, axially extending latch tabs 1094 are provided (see FIG. 6 and FIG. 15). The latch tabs 1094 extend generally parallel to central axis 1018 (e.g. plus or minus 15 degrees) and are spaced radially outward from casing member 1066 forming a gap 1067 therebetween. The axially extending latch tabs 1094, like the catch tabs 1086, are on the outlet side 1072. With reference to FIG. 6, in this embodiment, the latch tabs 1094 extend through slots 1096 in the peripheral support flange 1088. Slots 1096 are also illustrated in FIG. 17A. The latch tabs 1094 are dimensions to extend entirely axially through and axially beyond the peripheral support flange 1088 such that the distal end 1098 of the latch tabs 1094 is exposed on the outlet side of the peripheral support flange 1088. The distal end 1098 of the latch tabs 1094 forms a relief zone 1100 on a radially inner side of the latch tabs 1094 on the outlet side of the peripheral support flange 1088. The latch tabs 1094 extend axially from seal support flange 1068. The relief zone 1100 is formed, at least in part, by an undercut arrangement provided by the seal support flange 1068 and latch tabs 1094.

In some embodiments, the frame member may not include the casing portion and the relief zone 1100 could be provided directly between the latch tabs 1094 and the filter media pack.

In one embodiment, the latch tabs 1094 extend axially at least 0.25 inches, more preferably at least 0.5 inches, more preferably at least 0.75 inches and in some embodiments more than 1 inch from either bottom side 1072 or a portion of the seal support flange 1068 that will axially abut the peripheral support flange 1088. The latch tabs 1094 will have a thickness perpendicular to axis 1018 and a width parallel perpendicular to thickness and axis 1018 sufficient to provide sufficient strength to the latch tabs 1094. Preferably, the thickness of the latch tabs 1094 is at least 0.1 inch and more preferably at least 0.2 inches but less than 0.75 inches and more preferably less than 0.5 inches. The width is at least 0.1 inch and more preferably at least 0.2 inches but less than 0.75 inches and more preferably less than 0.5 inches.

The relief zone 1100 is sized and configured to receive a hook portion 1102 of a buckle 1104 (also referred to as a latch) of the cover member 1006 for securing the cover to the housing body 1004 when the system 1000 is fully assembled. The buckle 1104 is illustrated in a buckled state (also referred to as a latched state) in FIGS. 1, 6, 16 and on the right side of FIG. 4. The buckle 1104 is illustrated in an unbuckled state (also referred to as an unlatched state) in FIGS. 2, 15 and on the left side of FIG. 4. The hook portion 1102 in the illustrated embodiment is in the form of a segment of bent wire.

The hook portion 1102 engages axially on an underside of the support flange 1088, which forms an axial catch, to axially compress the assembly, e.g. flange 1046 of the cover 1006/pre-cleaner assembly, press flange 1036 of primary filter 1010, seal support flange 1068 of the secondary filter 1012 and support flange 1088 of the housing body 1004 as well as any seal members provided therebetween to secure the components together. In other embodiments, more or less components will be provided in the assembly. For example, in some embodiments, a secondary filter element may not be provided and the assembly would only include the cover, the housing body and a single filter element, e.g. a primary element.

While the prior arrangement discloses the buckle 1104 cooperating with latch tabs 1094 provided on a secondary filter 1012, these latch tabs 1094 could be provided by other filters such as primary filter 1010, such as in the example where only a primary filter is provided. However, in embodiments where a primary filter and a secondary filter are provided, the latch tabs 1094 could be provided by the primary filter rather than the secondary filter or could be provided by multiple filters such as both the primary filter and the secondary filter.

Further, while the latch tabs 1094 are illustrated as extending through slots 1096 in the peripheral support flange 1088, other embodiments need not have the latch tabs 1094 extend through slots in the peripheral flange 1088. Instead, the latch tabs 1094 simply need to extend axially beyond peripheral support flange 1088 such that relief zone 1100 is formed to prevent hook portion 1102 from sliding radially outward beyond peripheral support flange 1088 such that the buckle 1104 cannot provide the axial compression to secure the components together.

Figure 16:
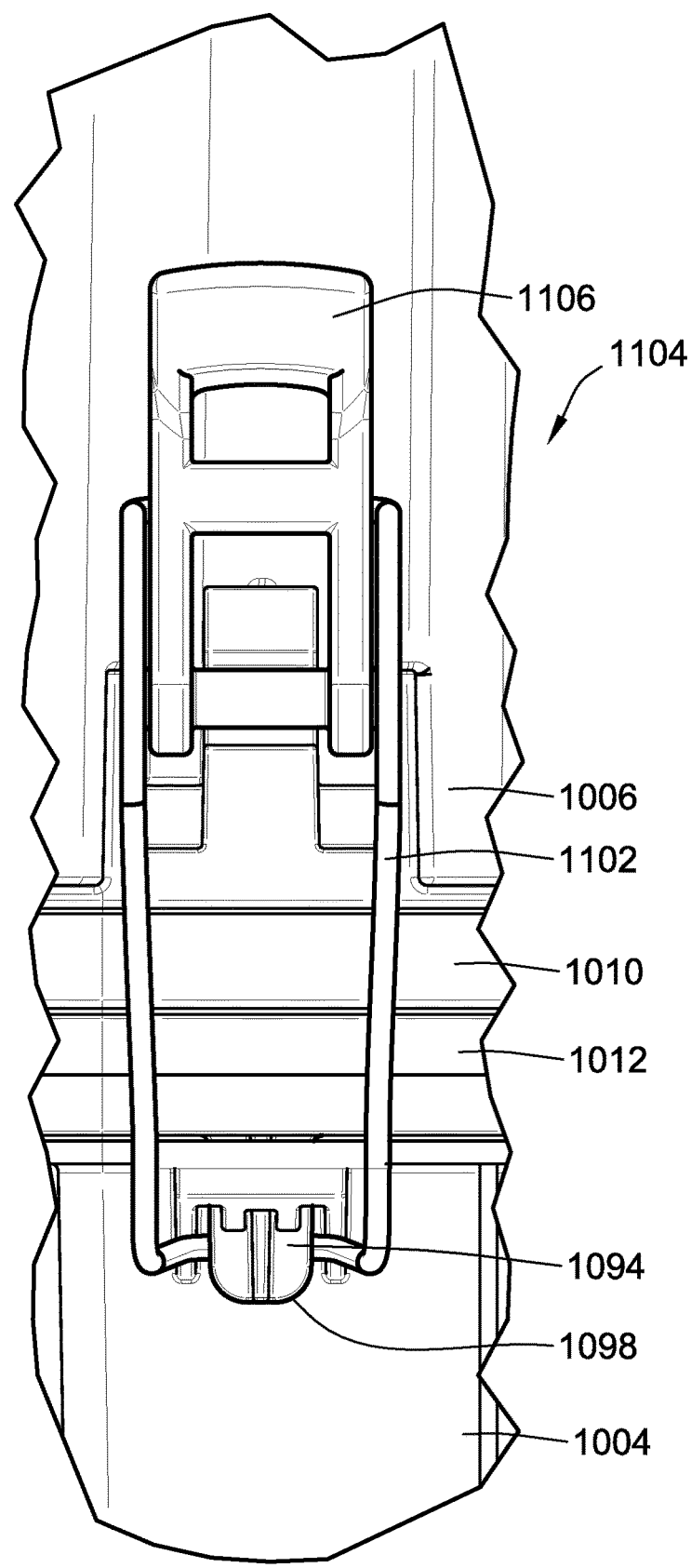
FIG. 16 is a further illustration of the latch arrangement.

With reference to FIGS. 1 and 15, the buckle 1104 further includes a handle portion 1106 that is pivotally coupled to the cover member 1006 for rotational motion about axis 1108 between a buckled position and unbuckled position. Further, the handle portion 1106 is pivotally coupled to hook portion 1102 for rotational motion about axis 1109. The handle portion 1106 and hook portion 1102 are operably coupled to one another and cover member 1006 such that the hook portion 1102 can be selectively transitioned around distal end 1098 of latch tab 1094 and into relief 1100 (e.g. as illustrated in FIG. 6) when the buckle is in an unbuckled state. Once the hook portion 1102 is radially between housing body 1004 and the radially inner side of latch tab 1094 (as illustrated in FIGS. 6 and 16), the handle portion 1106 can be pivoted to the buckled state (see FIG. 1, right side of FIG. 4 and FIG. 6) and the cover member 1006 is pulled axially tight but the hook portion 1102 stays captured within relief 1100.

With reference to FIGS. 6, 15, 19 and 20, the housing body 1004 that forms part of relief 1100 has a tapered region 1110 that is tapered such that the hook portion 1102 of buckle 1004 cannot be axially engaged and maintained in the buckled state unless latch tab 1094 is present. Thus, if the secondary filter 1012 is not installed, or is improperly installed, the latch tab 1094 will not be present and the buckle 1104 cannot be maintained in a buckled state to secure the cover member 1006 to the housing body 1004. Instead, if the hook portion 1102 is attempted to be engaged with the peripheral support flange 1088, the hook portion 1102 will simply slide axially and radially outward along the tapered region 1110 and no buckling of the cover member 1006 to the housing body 1004 will occur.

While the latch tabs 1094 are preferably formed as a single piece with the seal support flange 1068, in other embodiments, these components could be formed as separate components. Further, the latch tabs 1094 need not be integrally formed with the rest of the secondary filter 1012 in some embodiments.

The border frame 1030 and seal support flange 1068 are configured and dimensioned such that when the buckle 1104 is in a buckled state sufficient force is provided to maintain buckle 1104 in the buckled state. Buckle 1104 uses an over center linkage to facilitate this operation. The force of the buckle 1104 in the buckled state causes the first and second seals 1060, 1078 to activate between the corresponding flanges of the system. In one embodiment, the buckles 1104 are configured such that seal 1060 compresses between 15-30% axially at 6-9 psi.

Advantageously, and as can be seen in FIG. 5, the radially outer peripheral surfaces of border frame 1030 and seal support flange 1068 are visible when fully installed. This provides a quick visual indication as to whether both the primary and secondary filters are installed. Additionally, these outer peripheral edges may also be color coded to provide various information, e.g. the type of filter, the color scheme of the intended end user, etc.

When fully assembled, in some embodiments, the cover member 1006 will press axially against an inlet side of the border frame 1030 of the primary filter 1010. The outlet side of the board frame 1030 will press axially against an inlet side of the seal support flange 1068. The inlet side of the seal support flange 1068 will press axially against an inlet side of the peripheral support flange 1088.

Alternatively, the seal 1060 may have an axial thickness and stiffness that the border frame 1030 and seal support flange 1068 are not axially compressed against one another. Similarly, seal 1078 may have an axial thickness and stiffness that the seal support frame 1068 is not axially compressed into the peripheral support flange 1088.

The latch tabs 1094 have a generally T-shaped cross-section to provide increased rigidity. The corresponding slots 1096 also have a T-shape cross-section which can provide a keying feature. The rib of the T-shape extends radially outward in the illustrated embodiment.

Seal 1078 for sealing the seal support flange 1068 to the housing 1002 is preferably separately formed from seal 1060. As such, both components could take the form of separate gaskets. Seal 1078 may be mechanically secured to the secondary filter 1012, adhesively secured to the secondary filter 1012, or molded directly to the secondary filter 1012.

In the illustrated embodiment, the filter system has a generally rectangular cross section with four sides. In the illustrated embodiment, the system includes four buckles 1104. Two latches are adjacent one side and two buckles 1104 on a second side opposite the first side. However, other systems could have more or less buckles and could have latches on sides three and four that extend between the first two sides discussed above. While not illustrated, each buckle 1104 will have a corresponding latch tab 1094.

Figure 21:
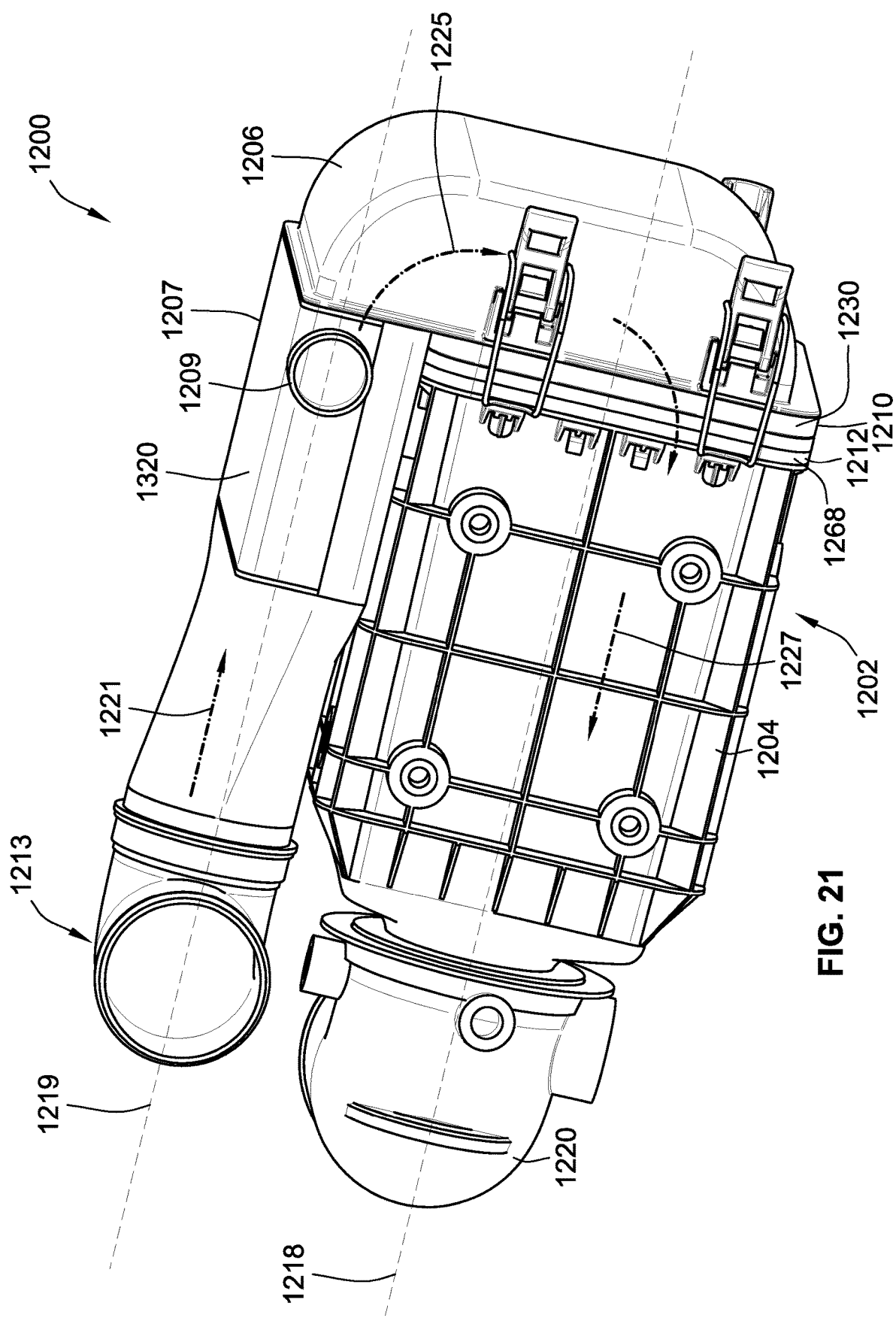
FIGS. 21 and 22 are perspective illustrations of an embodiment of a filter system.
Figure 22:
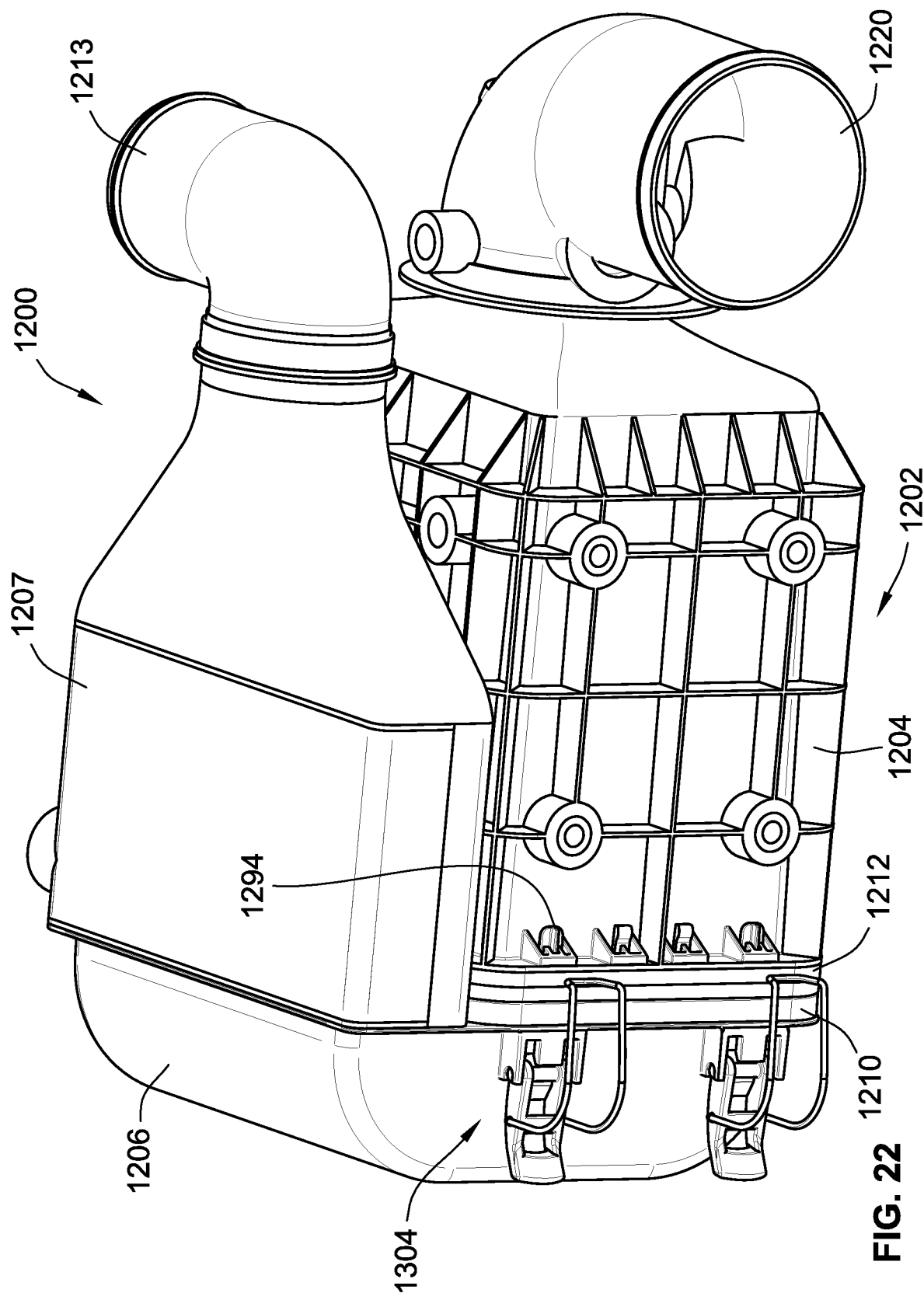

FIGS. 21 and 22 illustrate a further embodiment of a filter system 1200. The filter system 1200 is similar to filter system 1000 described previously and those features described above are equally applicable to this filter system unless contradicted by the following disclosure.

Filter system 1200 includes a filter housing 1202 which includes a housing body 1204, a housing cover member 1206 and a pre-cleaner assembly 1207. The filter housing 1202 operably holds first and second filters 1210, 1212 within an internal central cavity of the housing body 1204 in a manner similar to the prior embodiments discussed above.

Figure 23:
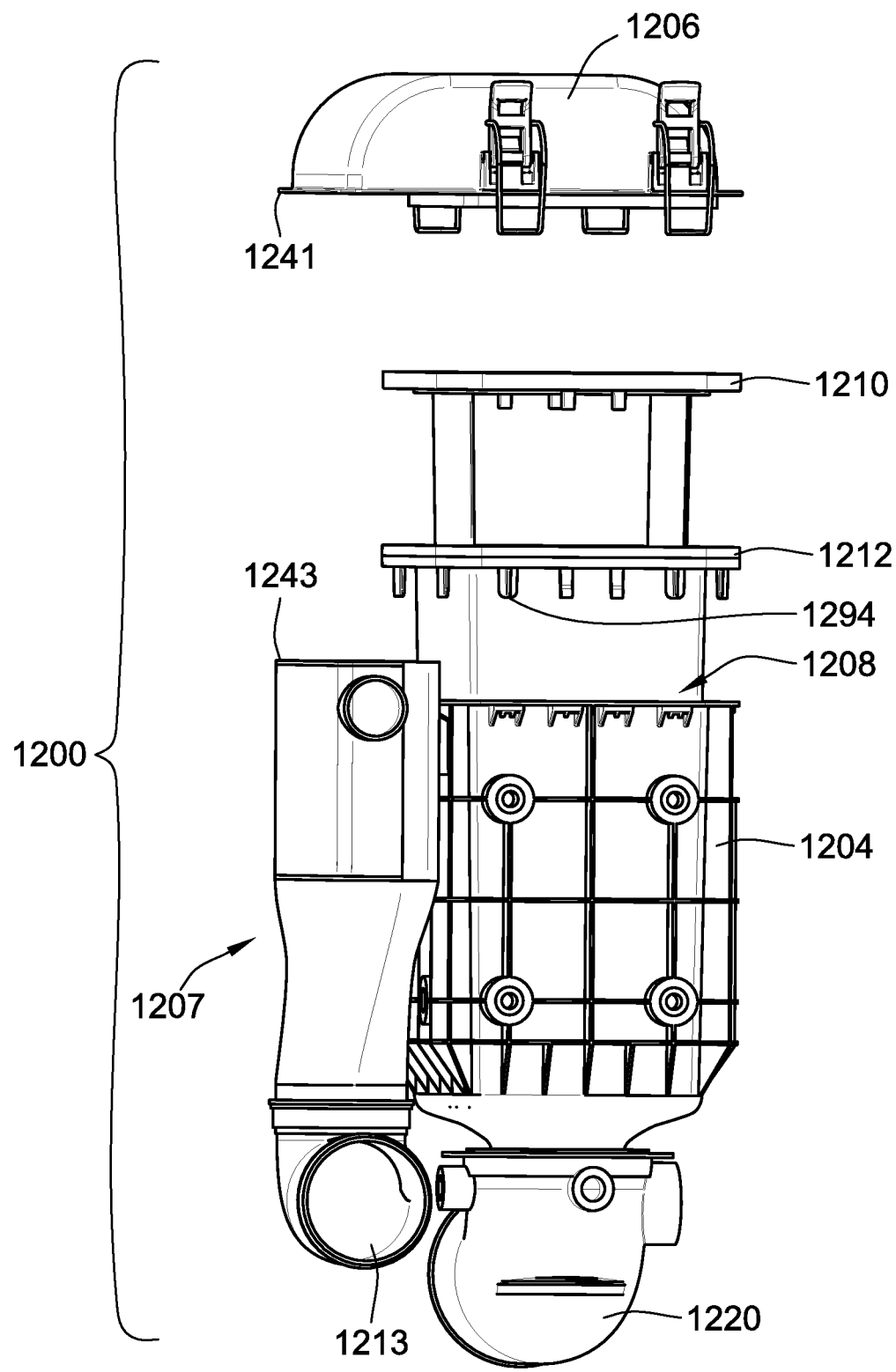
FIGS. 23-25 are partial exploded illustrations of the filter system of FIG. 21.

In this embodiment, the pre-cleaner is provided by pre-cleaner assembly 1207 that is not part of or integral with cover member 1206. As such, when a user removes cover member 1206 to provide access to a central cavity 1208 (See FIGS. 23, 26 and 27 for cavity 1208), the pre-cleaner assembly 1207 is not removed from the housing body 1204 with the cover member 1206.

In this embodiment, the cover member 1206 operably fluidly communicates the pre-cleaner assembly 1207 with the housing body 1204 such that fluid that has passed through the pre-cleaner assembly 1207 passes through the housing body 1204 and particularly the first and second filters 1210, 1212 housed therein.

Figure 27:
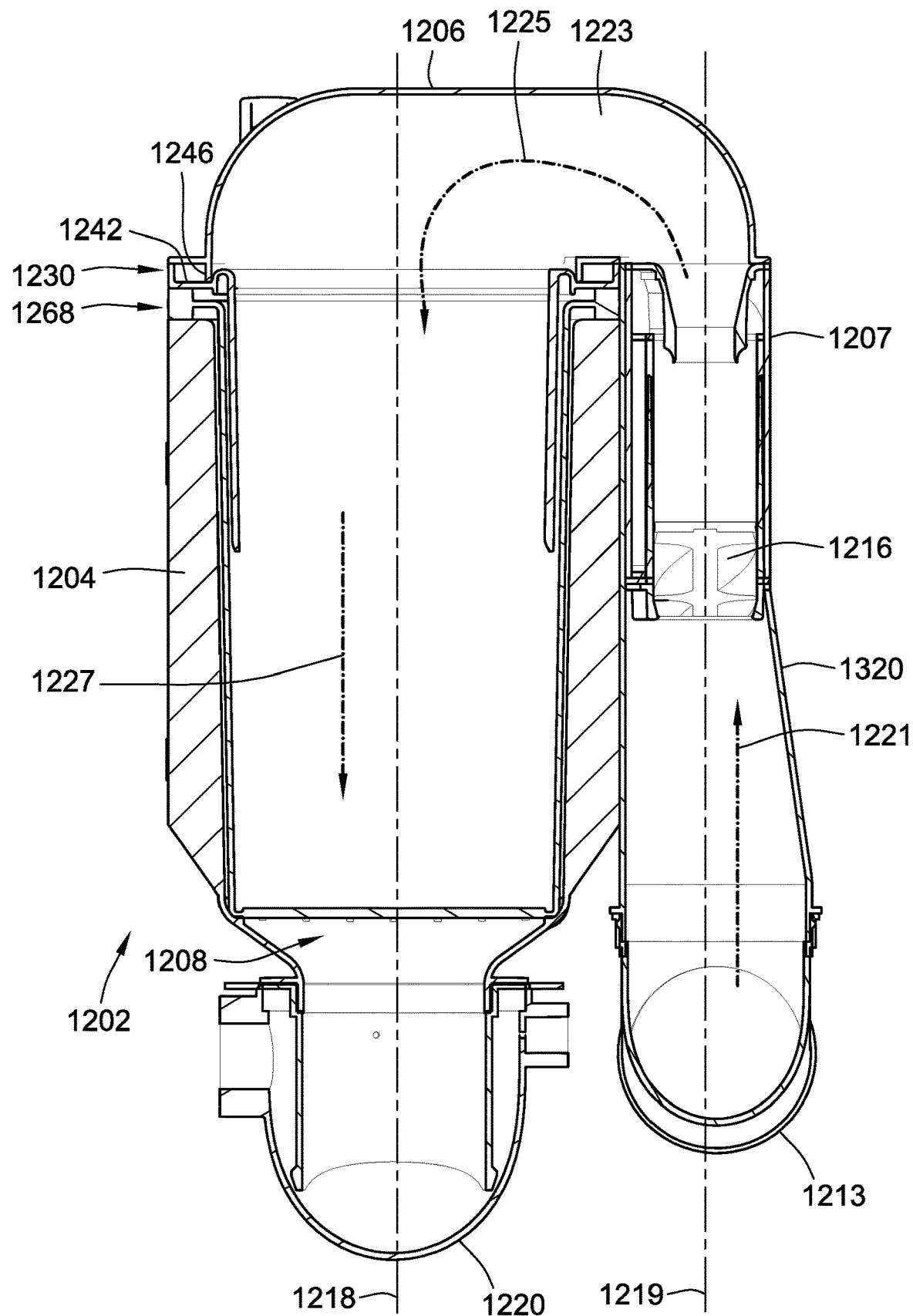
Figure 28:
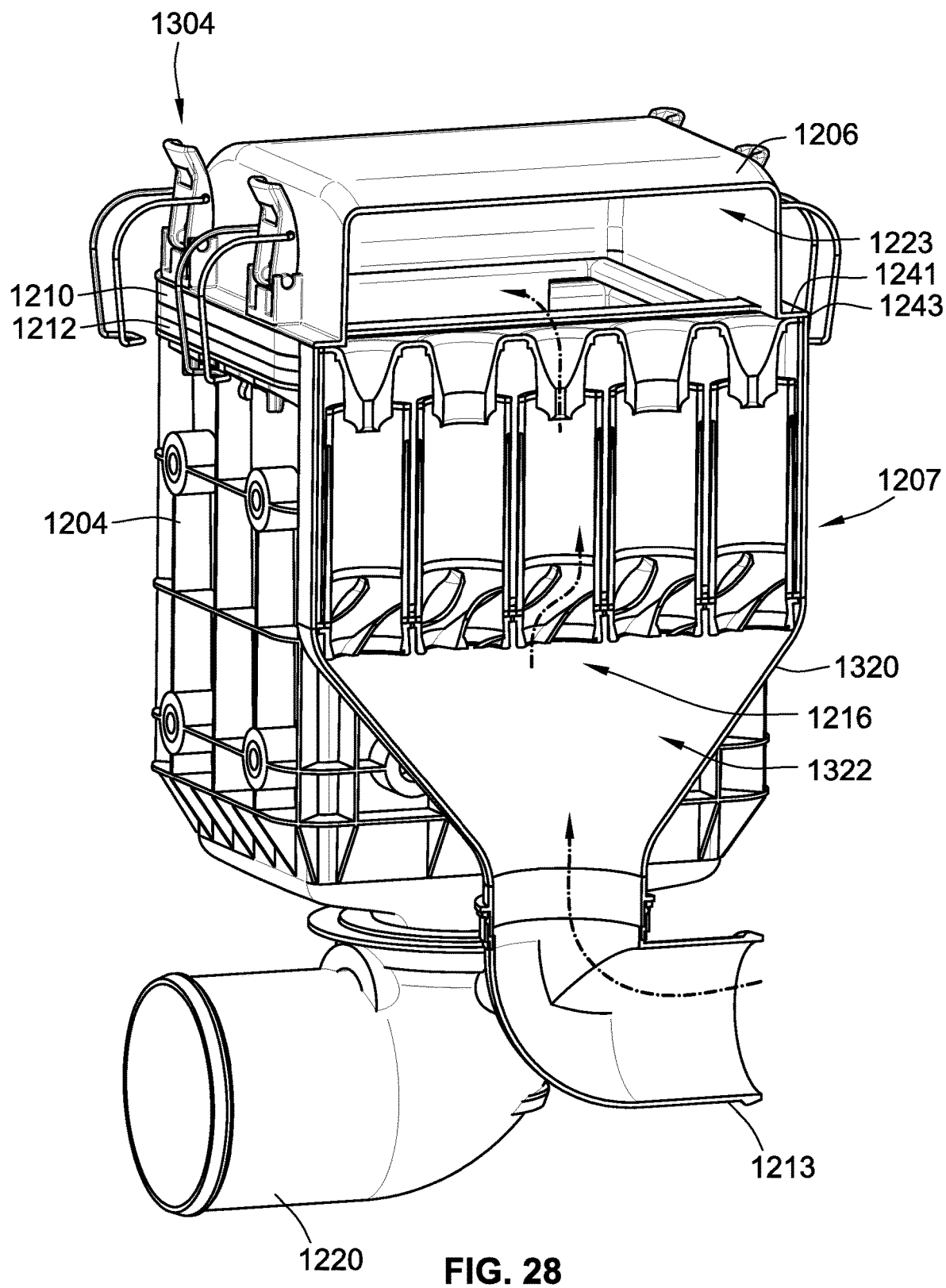

With reference to FIGS. 21 and 27, the pre-cleaner assembly 1207 is laterally offset from the first and second filter elements (represented by border frame 1230 and seal support flange 1268 as no filter media is provided but is similar to prior embodiments) in a direction generally parallel to central axis 1218 that passes through the central cavity 1208 of the housing body 1204 that holds the first and second filters 1210, 1212.

In this embodiment, the pre-cleaner assembly 1207 defines a second central axis 1219 that is generally parallel to central axis 1218 that passes through the housing body 1204. Generally parallel shall be such that the axes have an angle of less than 30 degrees therebetween. The axes 1218, 1219 preferably have an angle of less than 20 degrees and more preferably less than 10 degrees therebetween.

In this configuration, fluid to be filtered (e.g. air) will enter the filter system 1200 through inlet 1213. The fluid enters the spin tubes 1216 (see FIG. 27) flowing in a first direction illustrated by arrow 1221 that is generally parallel to second central axis 1219. After passing through the spin tubes 1216, the fluid will pass into a cavity 1223 of the cover member 1206 that fluidly connects a downstream end of the pre-cleaner assembly 1207 with an upstream end of the portion of the housing body 1204 that defines central cavity 1208. The fluid will flow from the pre-cleaner assembly 1207 through the cover member 1206 to the first and second filters 1210, 1212 as illustrated by arrow 1225. The fluid will then flow through the filters 1210, 1212 generally parallel to central axis 1218 in an opposite, second direction illustrated by arrow 1227.

As noted, the general direction of the fluid flow through the pre-cleaner illustrated by arrow 1221 is generally opposite the general direction of the fluid as it flows through the housing body 1204 and filters 1210, 1212 as illustrated by arrow 1227. In this configuration, the fluid flow makes substantially a 180 degree turn in direction from exiting the pre-cleaner assembly 1207 and entering the housing body 1204 and filters 1210, 1212.

While the inlet 1213 and outlet 1220 are also generally illustrated as having fluid flowing in substantially opposite directions such an arrangement is not necessary and will typically be dependent on the particularly upstream and downstream locations of the fluid flow system in which the filter system 1200 is mounted. More particularly, upstream from the pre-cleaner assembly 1207, the dirty fluid makes a 90 degree bend. Similarly, after the clean fluid exits the second filter 2012 (e.g. a secondary filter), the clean fluid will may another 90 degree bend downstream from the second filter 2012 as it passes through outlet 1220. However, in other embodiments, other configurations leading up to and exiting the filter system 1200 can be provided.

Figure 24:
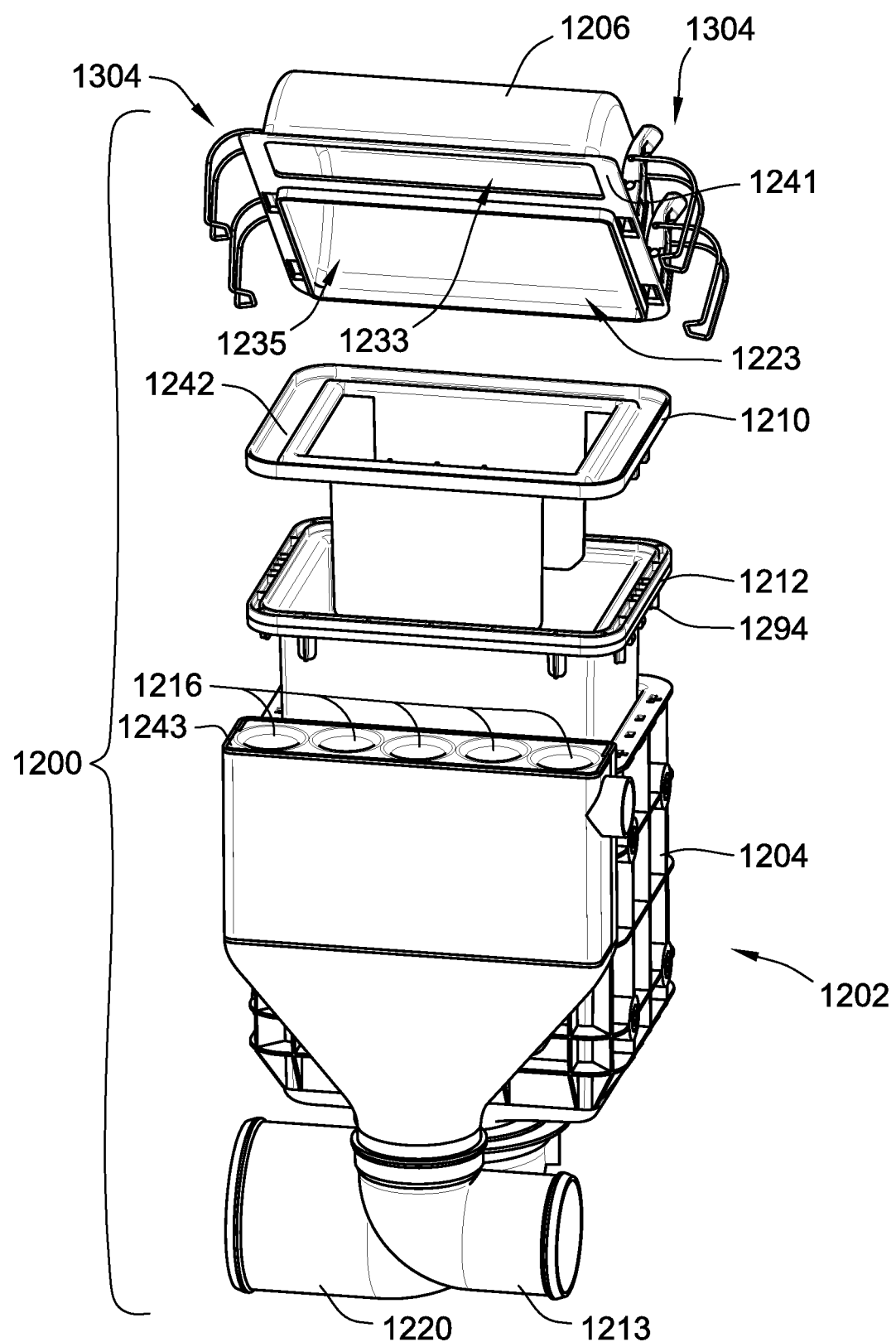
Figure 26:
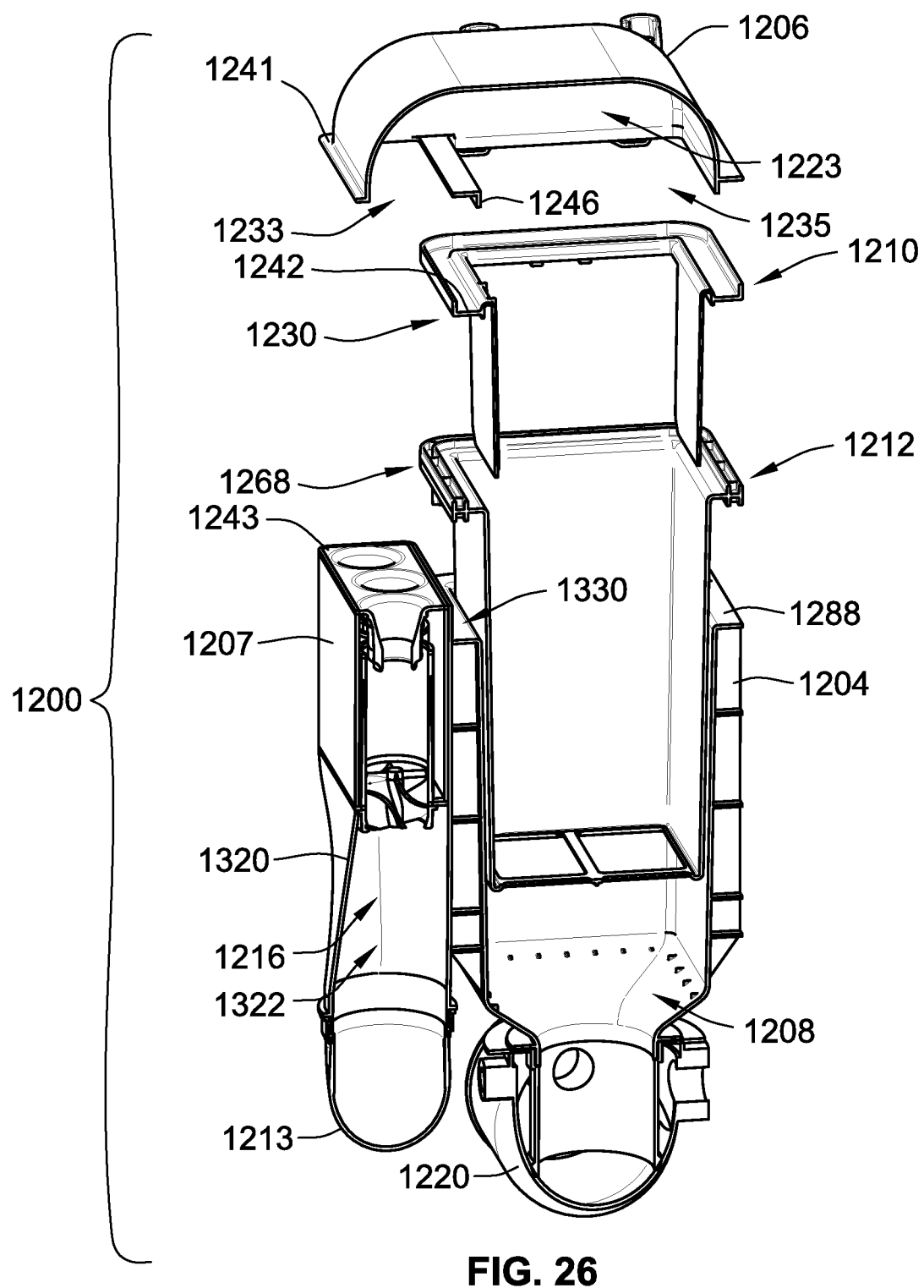
FIGS. 26-28 are cross-sectional illustrations of the filter system of FIG. 21.

With reference to FIGS. 24 and 26, the cover member 1206 includes a pair of openings 1233 and 1235 that communicate with and provide access to cavity 1223. Pre-cleaned fluid that has exited spin tubes 1216 of pre-cleaner assembly 1207 enters the cavity 1223 through first opening 1233. The fluid will make a redirection of approximately 180 degrees and exit cavity 1223 and cover member 1206 through second opening 1235.

In some embodiments, a seal member surrounding opening 1233 is not provided between cover member 1206 and the pre-cleaner assembly 1207. As such, radially extending flange 1241 of the cover member 1206 axially abuts free end 1243 of the pre-cleaner assembly 1207. However, in other embodiments, a seal member could be provided to prevent fluid bypass between the cover and the portion of the pre-cleaner assembly 1207. Similarly, a seal member surrounding opening 1235 is not provided between cover member 1206 and housing body 1204. However, in other embodiments, a seal member could be provided.

The cover member 1206 includes an axially extending annular flange 1246 that is similar to flange 1046 and that presses axially against a first side 1242 of border frame 1230 when the cover is fully installed as described with regard to prior embodiments.

Buckles 1304 secure the cover member 1206 to the housing body 1204 and pre-cleaner assembly 1207. The buckles 1304 cooperate with the second filter 1212 and particularly latch tabs 1294 thereof as described with reference to prior embodiments to secure the cover member 1206. While four buckles 1304 are disclosed, more buckles could be incorporated and particularly buckles that are adjacent the sides of the cover that do not have any buckles illustrated.

Figure 25:
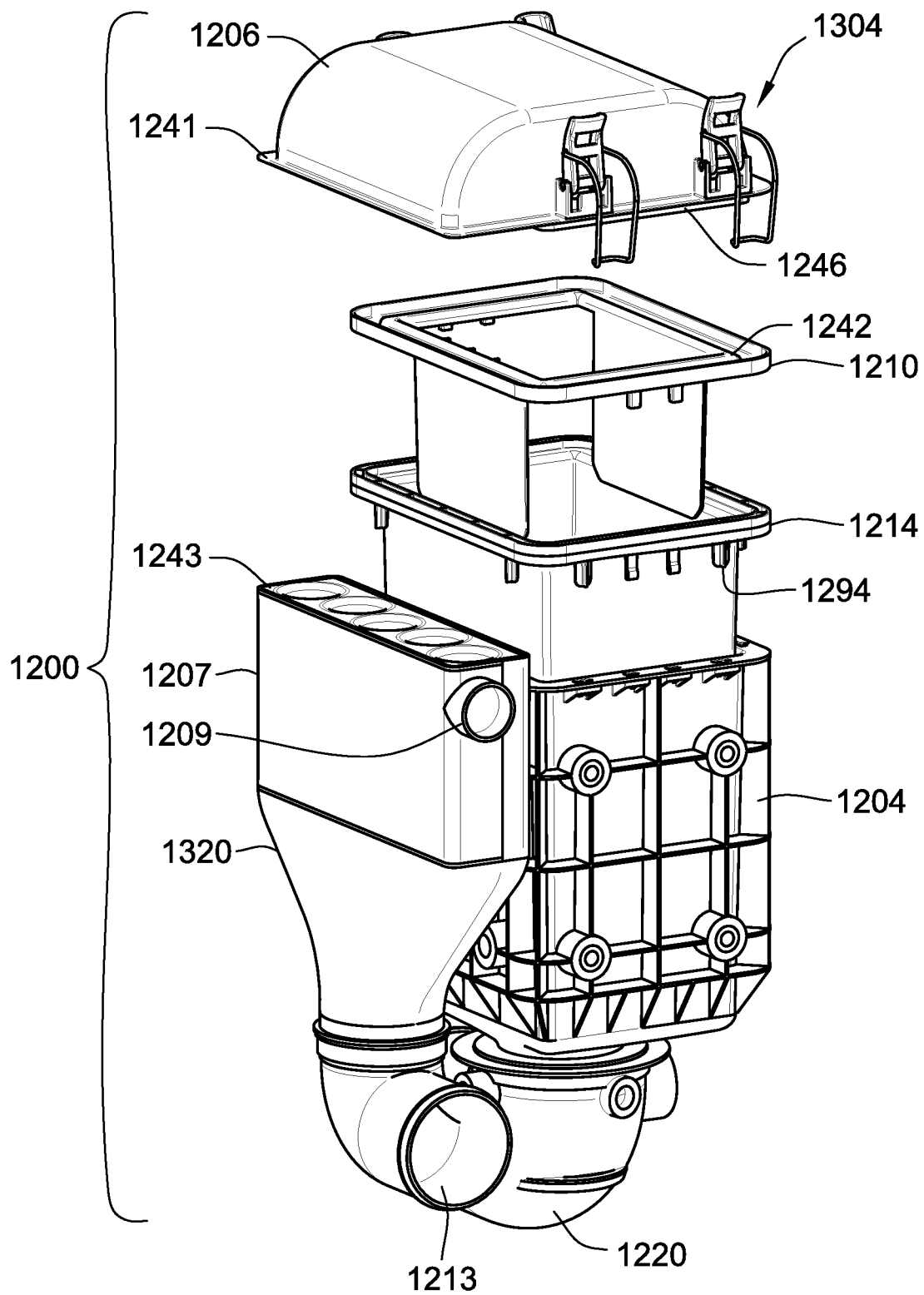

With reference to FIGS. 25 and 26, the pre-cleaner assembly 1207 includes a pre-cleaner body 1320 that defines a cavity 1322 that houses the spin tubes 1216. In the illustrated embodiment, the housing body 1204 and pre-cleaner body 1320 are formed as separate components and then secured together. For instance, bolts or other fastening devices could be used to secure the pre-cleaner body 1320 to a side of the housing body 1204. However, in other embodiments, a single body could form both the housing body 1204 and the pre-cleaner body 1320 and particularly the cavities 1208 and 1322 defined thereby.

The filter system 1200 also includes a vent 1209 for venting impurities removed from the fluid using the spin tubes 1216. In this embodiment, the vent 1209 forms part of the pre-cleaner body 1320. Further, the spin tubes 1216 may be a removable component from the pre-cleaner body 1320 such that they can be cleaned or otherwise replaced. If multiple spin tubes 1216 are provided, they could be removed independently or as a group (e.g. as a bank of spin tubes). Further, when the cover member 1206 is removed, this provides access to the removable spin tubes (if they are removable) such that they can be removed for cleaning or replacement. Thus contemplated methods include removing the cover member 1206 and then removing the spin tubes individually or as a group depending on the configuration.

With reference to FIG. 26, to allow for stack-up of the border frame 1230 and the seal support flange 1268 the end 1243 or pre-cleaner housing 1320 against which the cover member 1206 seats is axially offset from peripheral support flange 1288 forming stepped region 1330. However, in other embodiments, flange 1241 of the cover member 1206 could have a stepped profile and end 1243 could align with the stacked first and second filters 1210, 1212 in an assembled state.

In the illustrated embodiment, the border frame 1230 and the seal support flange 1268 operably fluidly communicate the opening 1235 with the central cavity 1208 of the housing body. However, in other embodiments, it is contemplated that the housing cover member 1206 could directly contact the peripheral support flange 1288.

In an embodiment, a method of servicing a filter system 1200 is provided. The method includes removing a cover member 1206. The method includes removing one or more filters from the filter system 1200 and particularly from housing body 1204. The method includes inserting a new one or more filters 1210, 1212 into the housing body. The method includes securing the cover member 1206.

In one particular embodiment, the step of removing the cover member 1206 does not include moving the pre-cleaner assembly 1207 or components thereof including the spin tubes 1216 or vent 1209.

Further, the step of securing the cover member 1206 includes operably fluidly connecting the pre-cleaner assembly with the housing body 1204.

Additionally, methods of servicing include: unbuckling buckle 1104, 1304 from latch tabs 1094, 1294 to remove the cover member 1006, 1206; removing one or more filters having latch tabs 1094, 1294; installing a new one or more filters having latch tabs 1094, 1294; and securing the cover member 1006, 1206 by buckling the buckles 1104, 1304 to the latch tabs 1094, 1294 of the newly installed one or more filters.

FIGS. 29-32 illustrate a further embodiment of a filter system 1500. The filter system 1500 includes a filter housing 1502 that includes a housing body 1504 and a cover member 1506. This embodiment incorporates many features of prior embodiments. The discussion of this embodiment will focus on the differences and any features of the prior embodiments may be incorporated into or combined with the features of this embodiment where not expressly contradicted.

The filter system 1500 will again use a buckle assembly including hook portions 1602 and buckles 1604 to secure the cover member 1506 to the housing body 1504. The hook portions 1602 will again cooperate with a frame member of an installed filter element. More particularly, the hook portions 1602 will cooperate with latch tabs 1594 provided by a frame member of a filter element when securing the assembly together. In this embodiment, the latch tabs 1594 are provided by the frame member of primary filter 1510. Further, no secondary filter is provided in this embodiment. However, alternative implementations of this concept could include a primary filter and a secondary filter similar to prior embodiments. In those alternative arrangements, the latch tab could be provided by either of the primary or secondary filter elements.

The hook portions 1602 will again axially engage and press against an underside of the support flange 1588 or other radially extending catch like component of the housing body 1504. The latch tabs 1594 will once again ensure engagement and prevent the hook portions 1602 from disengaging from the axial catch provided on the housing body 1504 and particularly the outlet side of the support flange 1588 (e.g. by sliding radially outward).

In this embodiment, the latch tabs 1594 do not extend axially through slots formed in the support flange 1588. Instead, the latch tabs 1594 simply slide axially by radially outer edges 1589 of support flange 1588.

Figure 30:
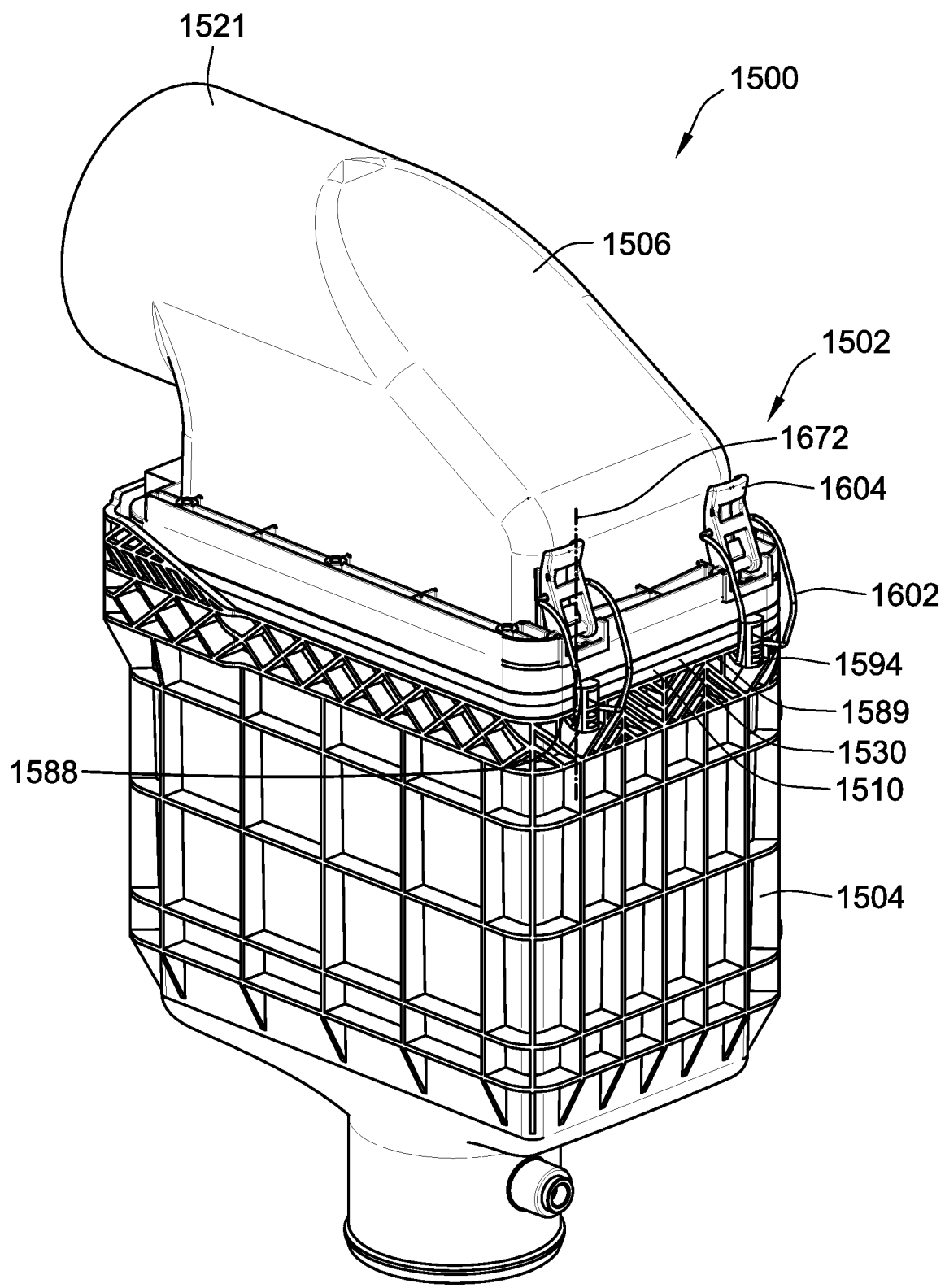
Figure 31:
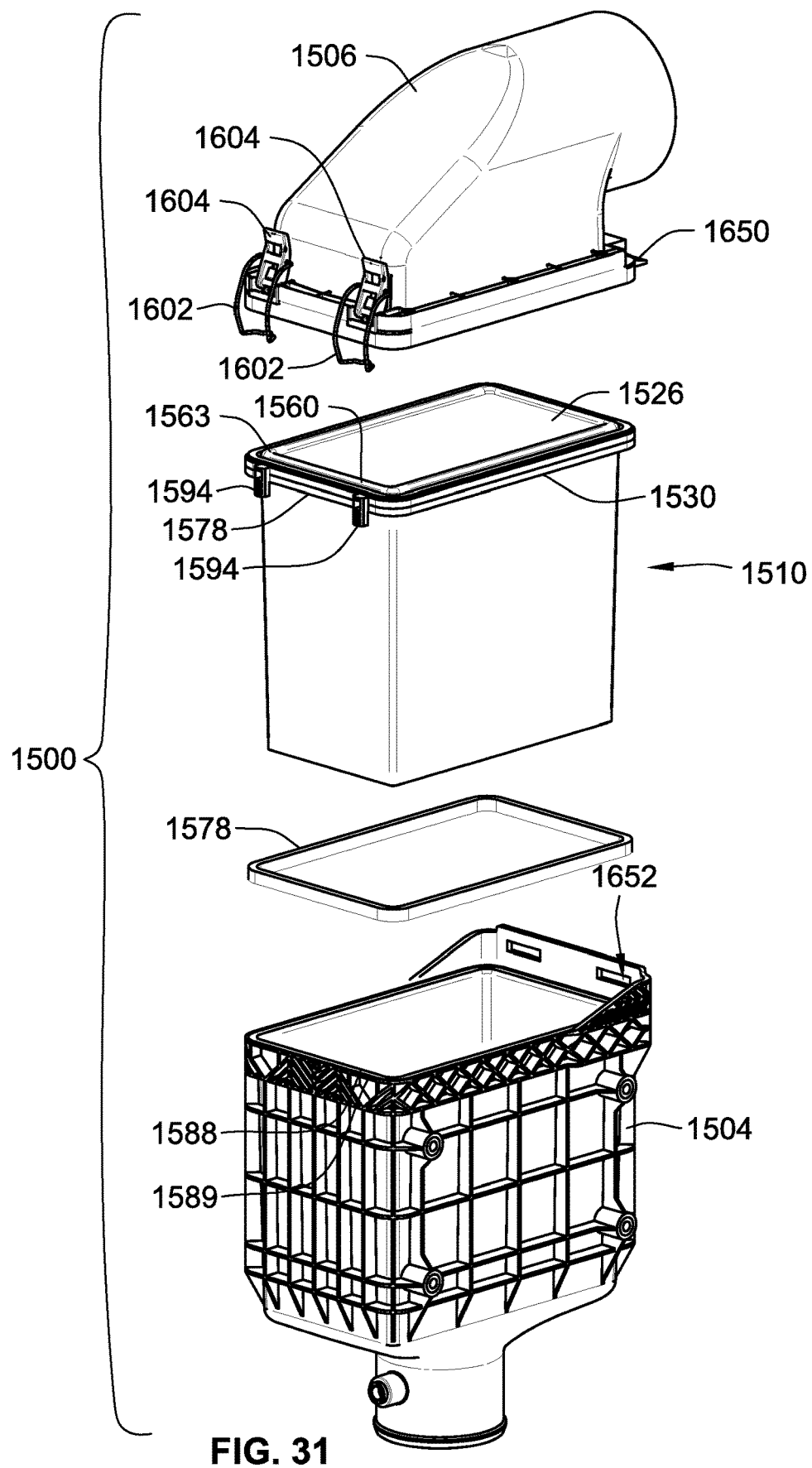
FIGS. 31-32 illustrate the filter system of FIGS. 29 and 30 in an exploded form.
Figure 38:
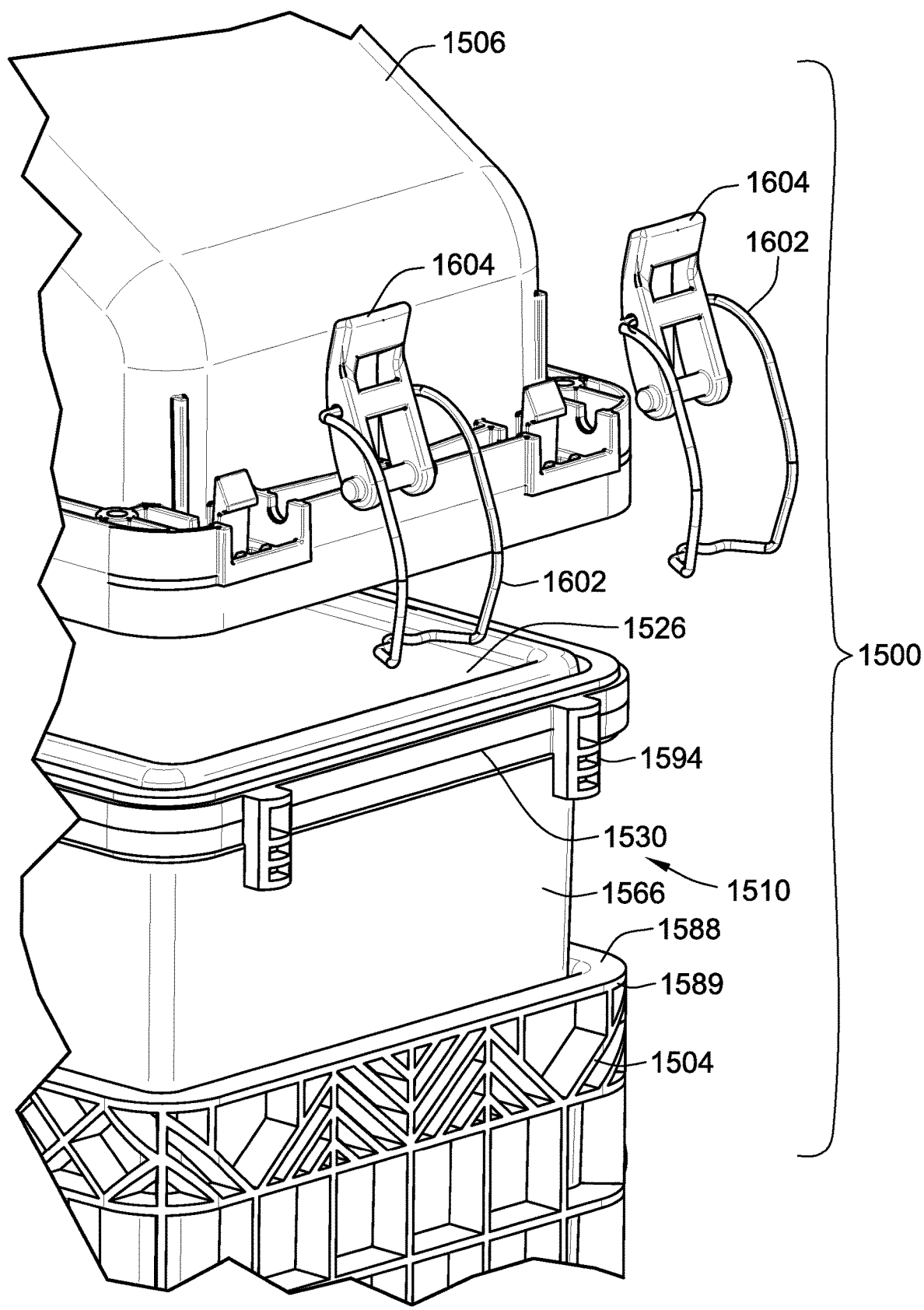

With reference to FIGS. 30, 31 and 38 this embodiment includes a pair of buckles 1604 on a single end of the filter housing 1502. Again, these buckles 1604 operate on an over-center principle.

Figure 29:
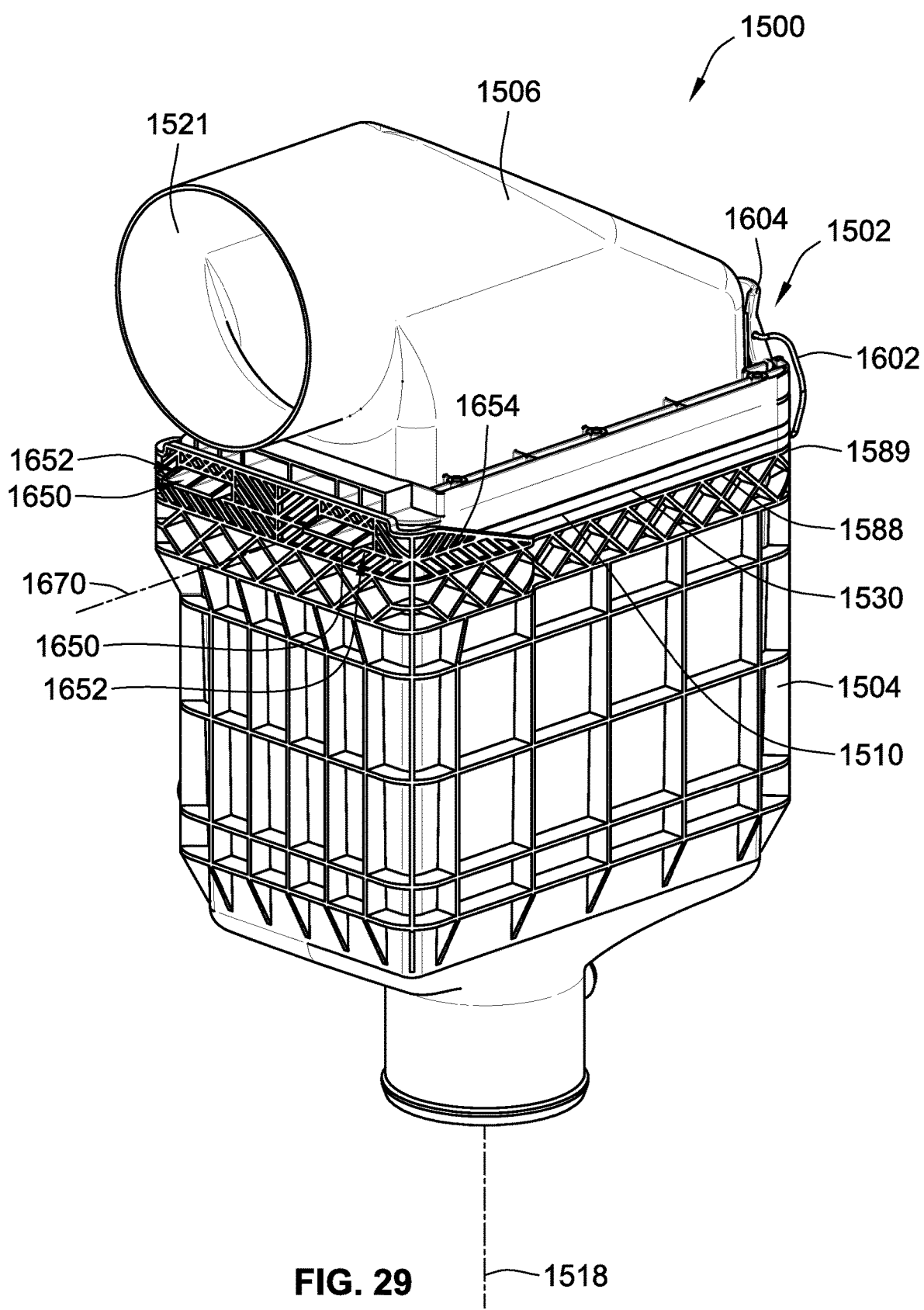
FIGS. 29 and 30 are perspective illustrations of an embodiment of a filter system.
Figure 32:
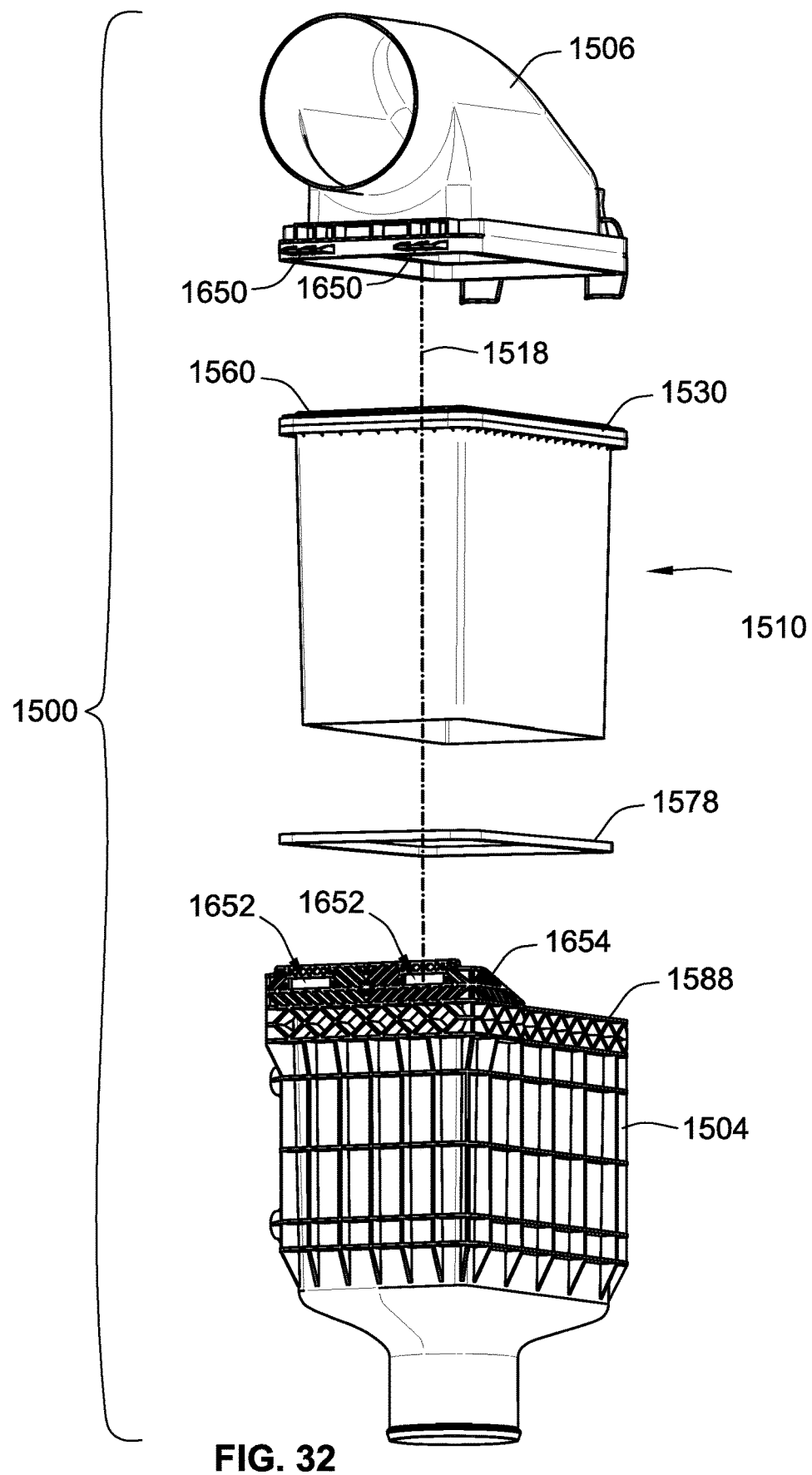
Figure 37:
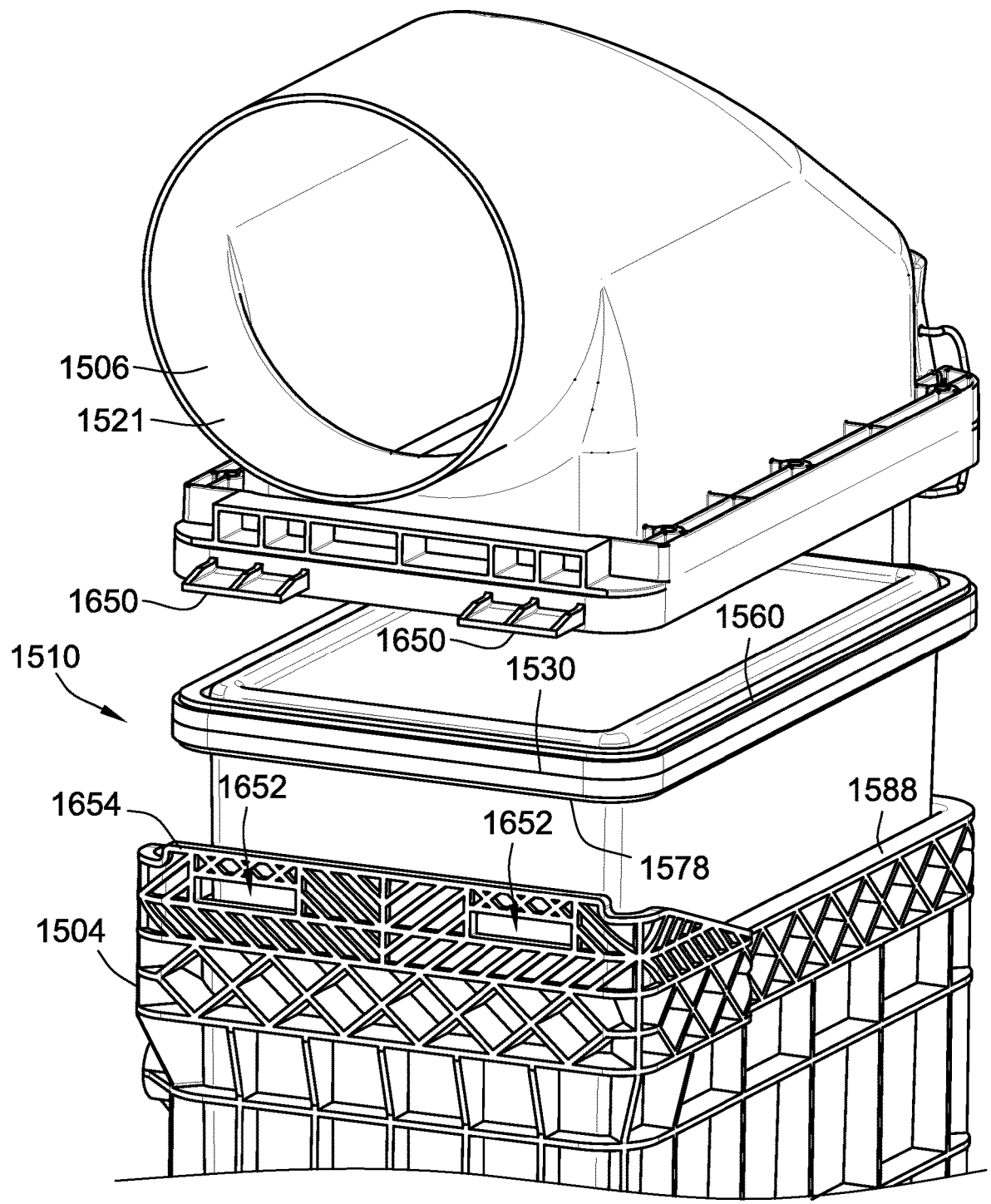
FIGS. 37 and 38 are enlarged exploded illustrations of the filter system.

With reference to FIGS. 29, 32 and 37 the cover member 1506 is secured in a different manner on the opposite end as buckles 1604. In this embodiment, the cover member 1506 includes a pair of laterally extending cover tabs 1650 that extend laterally through a pair of apertures 1652 formed in the housing body 1504. The apertures 1652 are formed in an axially extending flange portion 1654 that forms an end of the housing body 1504. In this embodiment, the axially extending flange portion 1654 extends axially beyond the support flange 1588. The axially extending flange portion 1654 is adjacent only a portion of the circumference defined by support flange 1588.

The engagement of the cover tabs 1650 and corresponding apertures 1652 of the housing body provides axial securement of the cover member 1506 to the housing body 1504 at that end. This engagement cooperates with the engagement of the hook portions 1602 and latch tabs 1954 and underside of support flange 1588 to axially secure the cover member 1506 to the housing body 1504. In this embodiment, the cover tabs 1650 extend through apertures 1652 in a direction generally perpendicular to the flow of fluid through the primary and secondary filters 1510, 1512 along axis 1518. Further, the cover tabs 1650 extend through the apertures 1652 along an axis 1670 that is generally perpendicular to an axis 1672 that is parallel to the axial force provided by the buckle 1604 securing the cover member 1506 to the housing body 1504.

While attaching the cover member 1506 to the housing body 1504 after any filter element(s), such as primary filter 1510, is installed, a pivoting motion will be used to secure the cover member 1506 to the housing body 1504.

After the requisite number of filter elements is located within the housing body 1504, the cover tabs 1650 will be positioned laterally into the apertures 1652 with the cover member 1502 oriented at an angle relative to its final orientation. As or after the cover tabs 1650 are being inserted or are fully laterally inserted through apertures 1652, the cover member 1506 will be rotated toward the housing body 1504 and filter elements 1510, 1512. The interaction of the cover tabs 1650 and apertures 1652 will allow for a hinging action between the cover member 1506 and housing body 1504 to transition the cover member 1506 into a securing position. Thereafter, the hook portions 1602 will engage latch tabs 1594 of the installed filter element(s) as well as the bottom side of the support flange 1588. The buckle 1604 will be transitioned to the buckled state illustrated in FIGS. 29 and 30 to axially compress the various components and secure the cover member 1506 to the rest of the filter system 1500.

Figure 33:
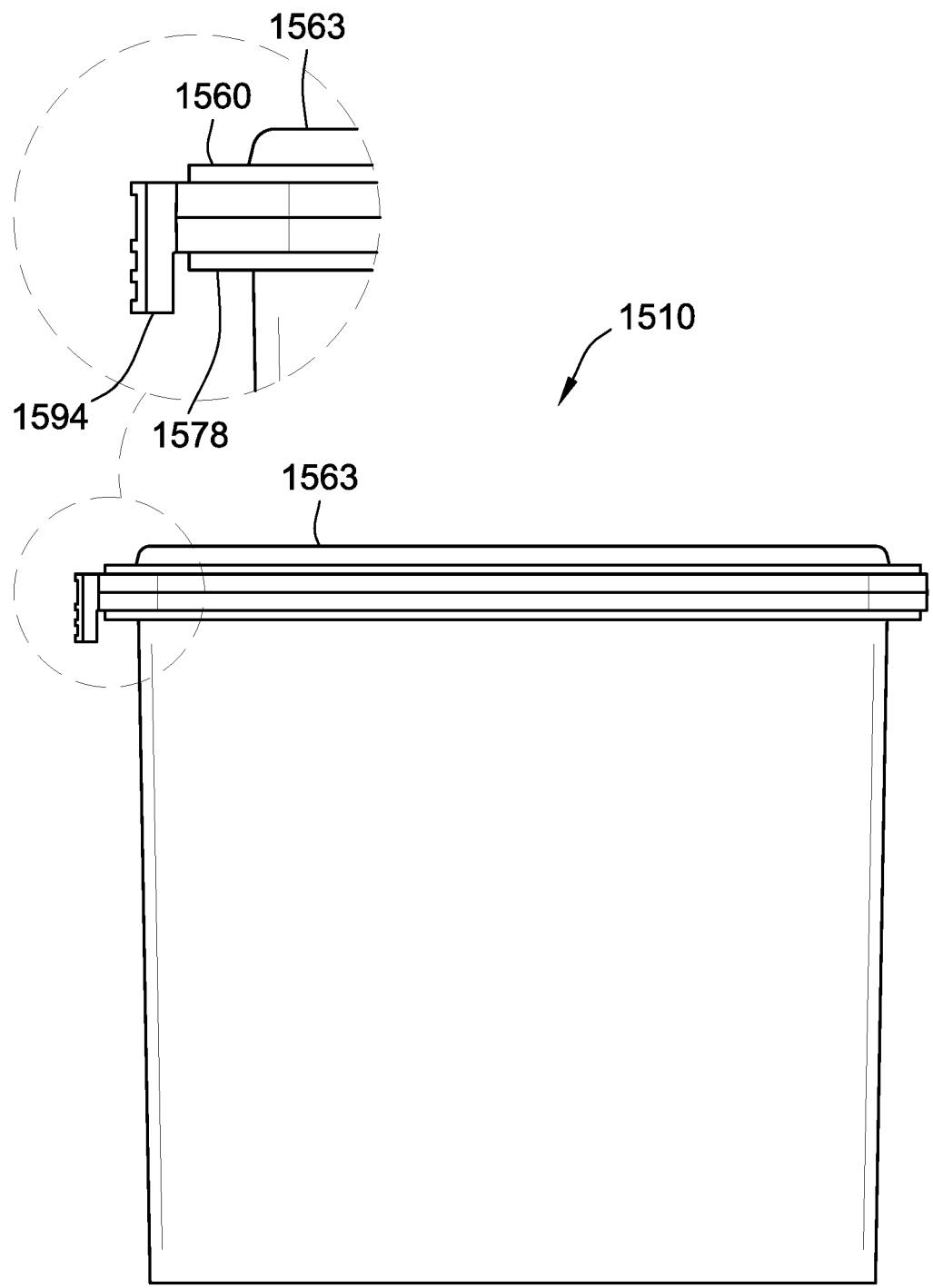
FIG. 33 is a profile illustration of a primary filter for use in the filter system of FIGS. 29-32.
Figure 34:
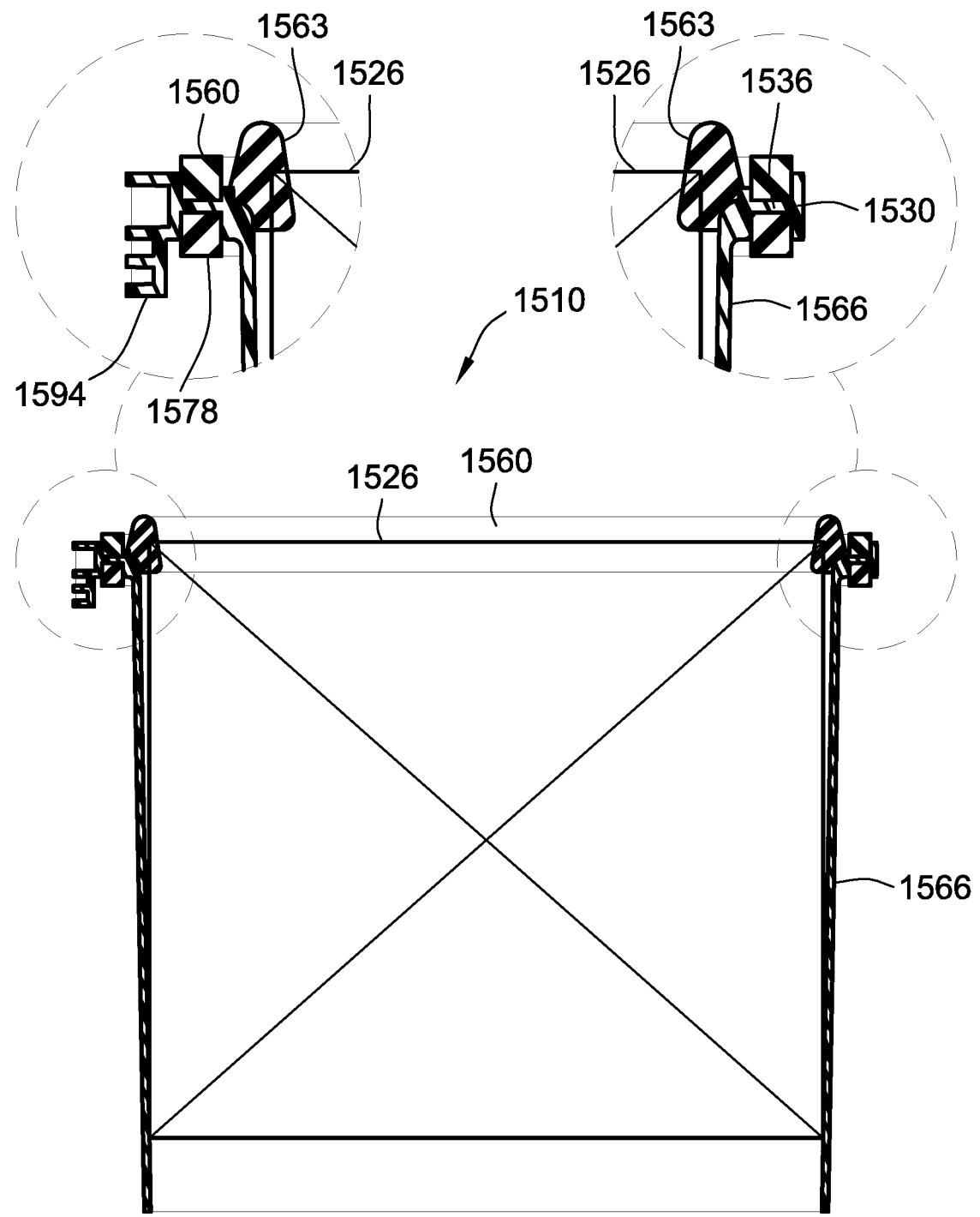
FIG. 34 is a cross-sectional illustration of the primary filter.
Figure 35:
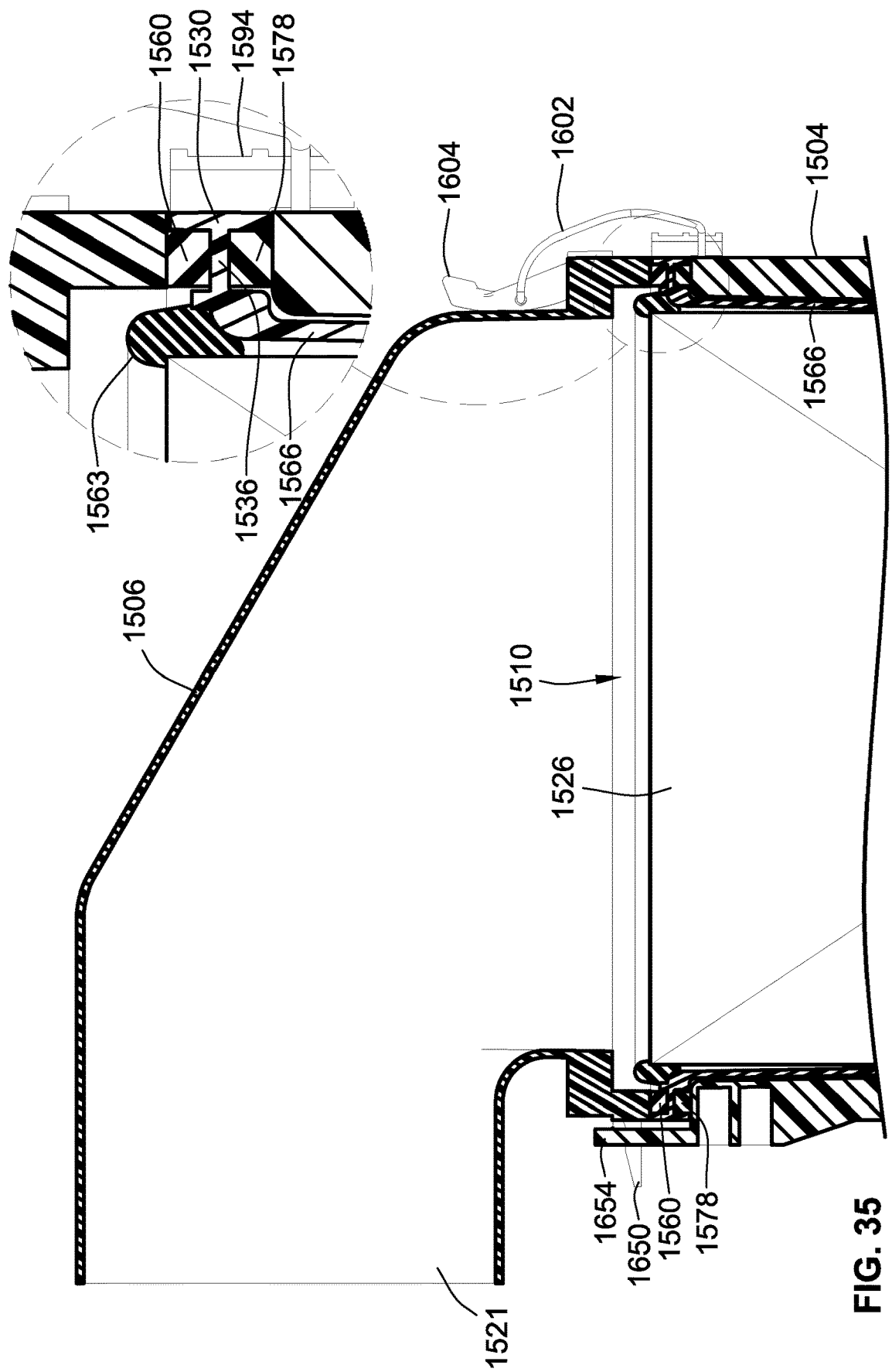
FIG. 35 is an enlarged partial cross-sectional illustration illustrating the cover member secured to the housing body.
Figure 36:
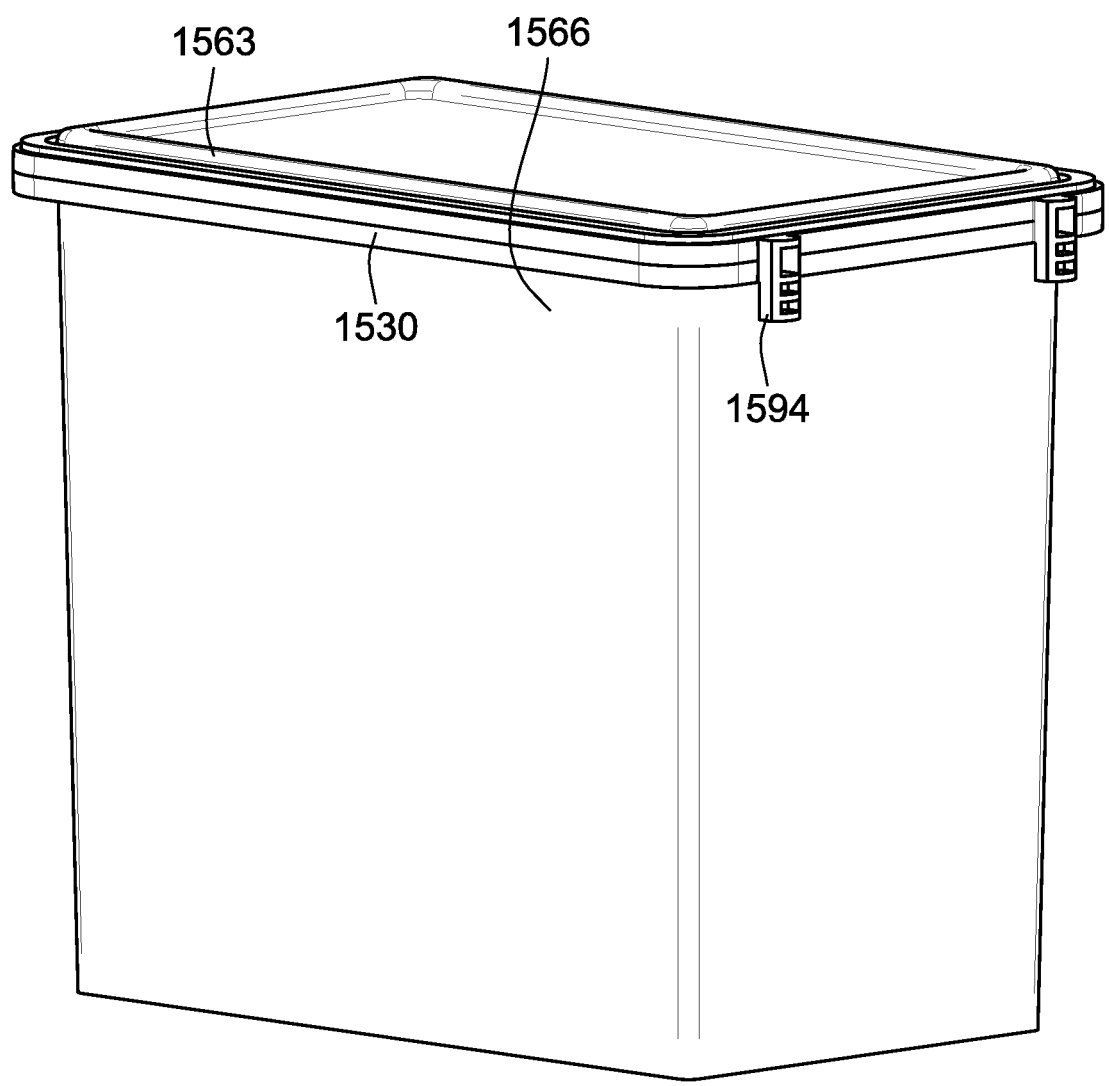
FIG. 36 is a further illustration of the primary filter.

FIGS. 33, 34 and 36 illustrate primary filter 1510 removed from the filter housing. FIG. 34 is a cross-section thereof. As illustrated and similar to filter system 1000, first and second seals 1560 and 1578 are provided. With additional reference to FIG. 35, first seal 1560 seals the primary filter 1510 to the cover member 1506. Second seal 1578 is provided to seal the secondary filter 1512 to the housing body 1504 and particularly to a top sealing surface of support flange 1588. The first and second seals 1560, 1578 are axially compressed due to the force provided by buckle 1604 and hook portion 1602.

In this embodiment, the primary filter 1510 includes a frame member, e.g. border frame 1530, that includes a casing member 1566 in which filter media pack 1726 is located. The border frame 1530 also provides press flange 1536 for supporting seals 1560, 1578. The filter media pack 1726 is operably sealingly attached to the border frame 1530 by an adhesive 1563. This adhesive could be a poured urethane, such as a foamed urethane that seals the frame member to the filter media pack 1726. This embodiment illustrates the casing 1566 extending then entire axial length of the filter media pack 1726, and beyond. Other embodiments need not have a casing at all. The filter media pack generally has a planar inlet flow face and a planer outlet flow face.

As noted above, in this embodiment, the primary filter 1510 includes latch tabs 1594 on one end of the primary filter 1510. The latch tabs 1594 cooperate with buckles 1604 as described previously to secure the cover member 1506 to the housing body 1504. The force of the buckle 1504 also assists in providing the axial pressure to provide the seal between, at a minimum, the housing body 1504 and the border frame 1530 to prevent dirty fluid bypass. In this embodiment, by providing both seals 1560, 1578 a seal is also provided between the primary filter 1510 and the cover member 1506.

When assembled, the cover member 1506 and housing body 1504 will sandwich the press flange 1536 of the primary filter 1510 and seal members 1560, 1578. In this embodiment, the radially outer peripheral surface of border frame 1530 that provides the press flange 1536 is visible when fully installed.

In this embodiment, the cover member 1506 is simply a cover member that assists in providing an air flow path to the primary filter 1510. In this embodiment, the cover member 1506 is free of any precleaner mechanism or precleaner components. The cover member includes a connection region 1521 that will be operably connected to an inlet duct for supplying unfiltered air. In this embodiment, the air entering through the cover member 1506 will flow in a direction generally across an inlet flow face of primary filter 1510.

While this embodiment only includes latch tabs 1594 on one end, more or less latch tabs could be provided depending on the configuration of the housing 1502, such as in prior embodiments. Further, while this embodiment does not include a precleaner, a precleaner assembly could be provided upstream of the primary filter. The precleaner may be part of the cover or a separate component.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter comprising:
   a filter media pack having an inlet face and an outlet face with a central axis extending transversely through the inlet and outlet faces;
   a frame member attached to the filter media pack including a flange portion projecting radially outward;
   a tab projecting axially from the flange portion;
   wherein the frame member includes a casing portion surrounding the filter media pack, the flange portion projects radially outward from the casing portion, the tab is radially spaced outward from the casing portion such that the casing portion and the tab form a gap radially therebetween;
   an annular seal surrounding the casing portion and positioned radially between the casing portion and the tab; and
   further comprising a second tab projecting axially from the flange portion in the same direction as the tab, the second tab having a radially projecting nib extending radially outward.

2. A filter system comprising:
   a filter including:
      a filter media pack having an inlet face and an outlet face with a central axis extending transversely through the inlet and outlet faces;
      a frame member attached to the filter media pack including a flange portion projecting radially outward;
      a tab projecting axially from the flange portion;
   a cover member;
   a housing body having a central cavity receiving the filter, the housing body including a support flange for supporting and locating the filter within the central cavity;
   a latch securing the cover member to the housing body by engaging the tab;
   wherein the support flange has a slot receiving the tab axially therethrough, the latch does not secure the cover member to the housing body without the tab installed in the slot;
   wherein the flange portion is positioned on a first side of the support flange and a distal end of the tab is located on and extends beyond a second side of the support flange, the second side being axially opposite the first side, when the secondary filter is installed in the central cavity of the housing body, the latch engaging the tab on the second side of the support flange.

3. The filter system of claim 2, wherein the support flange has a slot receiving the tab axially therethrough, the latch does not secure the cover member to the housing body without the tab installed in the slot.

4. The filter system of claim 2, wherein a radially inner side of the tab and a radially outer surface of the housing body form a relief radially therebetween in which a portion of the latch is received when the latch is in a secured state.

5. The filter system of claim 3, wherein the housing body includes a tapered region adjacent the slot that prevents the latch from engaging the housing body when the tab is not present in the slot.

6. The filter system of claim 2, wherein the frame member of the filter includes a casing portion surrounding the filter media pack, the flange portion projects radially outward from the casing portion.

7. The filter system of claim 6, wherein the filter is a secondary filter that defines a central cavity within the casing portion;
   the filter system further comprising a primary filter having a primary filter media pack and a press flange attached to the primary filter media pack, the press flange being positioned axially between the cover member and the flange portion of the secondary filter when the primary filter and secondary filter are installed within the housing body.

8. A filter system comprising:
   a filter including:
      a filter media pack having an inlet face and an outlet face with a central axis extending transversely through the inlet and outlet faces;
      a frame member attached to the filter media pack including a flange portion projecting radially outward;
      a tab projecting axially from the flange portion;
   a cover member;

a housing body having a central cavity receiving the filter, the housing body including a support flange for supporting and locating the filter within the central cavity;

a latch securing the cover member to the housing body by engaging the tab;

wherein the frame member of the filter includes a casing portion surrounding the filter media pack, the flange portion projects radially outward from the casing portion;

wherein the filter is a secondary filter that defines a central cavity within the casing portion;

the filter system further comprising a primary filter having a primary filter media pack and a press flange attached to the primary filter media pack, the press flange being positioned axially between the cover member and the flange portion of the secondary filter when the primary filter and secondary filter are installed within the housing body wherein a first seal member is provided between the press flange and the flange portion;

wherein a second seal member is provided between the flange portion and the support flange.

9. The filter system of claim 8, wherein the first and second seal members are independent of one another.

10. The filter system of claim 9, wherein the press flange and filter are seal free.

11. The filter system of claim 8, wherein the cover member presses directly on the press flange.

12. The filter system of claim 2, wherein the housing body defines at least one aperture, the cover member including at least one cover tab extending outward therefrom, the cover tab extending into the aperture in the housing body when the latch is engaged with the tab of the filter.

13. The filter system of claim 12, wherein the latch provides an axial force securing the cover member to the housing body along a first axis and the cover tab extends into the aperture in the housing body along a second axis that is generally perpendicular to the first axis.

* * * * *